US008049927B2

(12) United States Patent
Morita

(10) Patent No.: US 8,049,927 B2
(45) Date of Patent: Nov. 1, 2011

(54) IMAGE PROCESSING APPARATUS AND CONTROL METHOD THEREOF

(75) Inventor: Seijiro Morita, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 527 days.

(21) Appl. No.: 12/363,578

(22) Filed: Jan. 30, 2009

(65) Prior Publication Data

US 2009/0213393 A1 Aug. 27, 2009

(30) Foreign Application Priority Data

Feb. 22, 2008 (JP) ................................. 2008-042071

(51) Int. Cl.
*G06F 15/00* (2006.01)

(52) U.S. Cl. ......................... 358/1.9; 358/3.06; 358/474

(58) Field of Classification Search ................... 358/1.9, 358/3.06, 474

See application file for complete search history.

(56) References Cited

U.S. PATENT DOCUMENTS

2009/0013056 A1* 1/2009 Weinstock et al. ........... 709/208
2009/0109503 A1* 4/2009 Namba ......................... 358/488

FOREIGN PATENT DOCUMENTS

JP 2003-241131 8/2003
JP 2004-170755 6/2004

* cited by examiner

*Primary Examiner* — King Poon
*Assistant Examiner* — Iriana Cruz
(74) *Attorney, Agent, or Firm* — Fitzpatrick, Cella, Harper & Scinto

(57) ABSTRACT

There are provided an image processing apparatus which corrects the curvature of a scanning line using image data in image formation, and a control method thereof. When reading out image data by burst transfer from a memory in the line direction of a scanning line on the basis of the read start address of the image data and the burst transfer length, the switching address in the line direction for switching a line of image data is set. The image processing apparatus generates, based on the switching address, the second read start address for reading out image data of the second line, so as to read out image data by burst transfer of at least the first line before line switching and the second line after line switching, in accordance with the set switching address. Image data is read out in accordance with an address generated by the address generator, to form an image in which the curvature of a scanning line is corrected.

6 Claims, 34 Drawing Sheets

IMAGE PROCESSING APPARATUS AND CONTROL METHOD THEREOF

BACKGROUND OF THE INVENTION

1. Field of the Invention

The present invention relates to an image processing apparatus and control method thereof.

2. Description of the Related Art

An electrographic image forming apparatus has conventionally been known. The electrographic image forming apparatus includes a laser source for scanning (irradiating) a photosensitive drum with a laser beam corresponding to image data, a photosensitive drum irradiated with a laser beam emitted from the laser source, and a charging roller for electrically charging the photosensitive drum. The electrographic image forming apparatus also includes a developer for developing, with toner, an electrostatic latent image on the photosensitive drum, which is formed by irradiating the charged photosensitive drum with a laser beam. The electrographic image forming apparatus further includes a transfer unit for transferring, onto a sheet (print paper), a toner image developed by the developer on the photosensitive drum.

In this image forming apparatus, when the photosensitive drum is scanned (irradiated) with a laser beam based on 1-line image data, the scanning line is ideally a straight line parallel to the axial direction of the photosensitive drum. However, the scanning line sometimes fails to form a straight line parallel to the scanning direction (i.e., the scanning line curves) owing to a mechanical error of the laser source or photosensitive drum attaching position or the like.

FIG. 26 depicts a view illustrating an example of the curvature (registration error) of a scanning line on a photosensitive drum.

In FIG. 26, a dotted line 2600 represents an ideal scanning line of a laser beam. A solid line 2601 represents an actual scanning line of a laser beam.

As a method for correcting the curvature of a scanning line, for example, the following techniques are proposed.

According to Japanese Patent Laid-Open No. 2003-241131, when assembling an exposure unit into an image forming apparatus main body, the inclination of a scanning line is measured using an optical sensor. The exposure unit is mechanically inclined in accordance with the inclination, adjusting the inclination of the scanning line.

According to Japanese Patent Laid-Open No. 2004-170755, the inclination and skew of a scanning line in an image forming apparatus are measured using an optical sensor. Bitmap image data is corrected to cancel the inclination and skew. An image is formed based on the corrected image data. The method in Japanese Patent Laid-Open No. 2004-170755 requires neither mechanical adjustment nor an adjustment process in assembly because the inclination and skew of a scanning line are corrected by image data. Compared to the method disclosed in Japanese Patent Laid-Open No. 2003-241131, the method disclosed in Japanese Patent Laid-Open No. 2004-170755 can cancel the inclination and skew of a scanning line at lower cost.

However, the method disclosed in Japanese Patent Laid-Open No. 2004-170755 requires a line buffer for storing bitmap image data of a plurality of scanning lines because blend processing is executed to blend data of a target scanning line and an upper or lower adjacent line at a skew of the scanning line, and print them. The number of line buffers depends on the skew width of the scanning line. For example, when the skew width of the scanning line corresponds to image data of N lines, line buffers capable of storing image data of N lines are needed. Since the skew width differs between image forming apparatuses, the number N of line buffers must be the number of lines exceeding the maximum value of the skew width. Ensuring many line buffers increases the memory capacity and a circuit scale for correcting bitmap image data, raising the cost.

SUMMARY OF THE INVENTION

An aspect of the present invention is to eliminate the above-mentioned problems with the conventional technology.

It is a feature of the present invention to provide an image processing apparatus which corrects the curvature of a scanning line by using image data at low cost with a simple arrangement by reducing the capacity of a line buffer for correcting the curvature of a scanning line, and a control method thereof.

According to an aspect of the present invention, there is provided an image processing apparatus comprising: an image forming unit configured to form an image on a photosensitive drum by scanning the photosensitive drum with a light corresponding to image data; a storage unit configured to store image data of at least a plurality of lines; a data reading unit configured to read out image data in a line direction of the scanning line from the storage unit on the basis of a read start address of the image data and a burst transfer length, and to burst-transfer the image data; a setting unit configured to set a switching address in the line direction for switching a line of image data read out by the data reading unit, the switching address being set so as to correct a curvature of the scanning line; a generation unit configured to generate, based on the switching address, a second read start address for reading out image data of a second line, so as to read out image data of at least a first line before line switching and the second line after the line switching, by burst transfer, in accordance with the switching address set by the setting unit; and an output unit configured to output image data for generating image data of one line on the basis of image data corresponding to an effective area in the image data which is read out from the storage unit and burst-transferred by the data reading unit.

According to another aspect of the present invention, there is provided a method of controlling an image processing apparatus including an image forming unit configured to form image on a photosensitive drum by scanning the photosensitive drum with a light corresponding to image data, the method comprising: a data reading step of reading out, based on a read start address of image data and a burst transfer length, the image data in a line direction from a memory which stores image data of at least a plurality of lines, and burst-transferring the image data; a setting step of setting a switching address in the line direction for switching a line of image data read out in the data reading step, the switching address being set so as to correct a curvature of the scanning line; a generation step of generating, based on the switching address, a second read start address for reading out image data of a second line, so as to read out image data by burst transfer of at least a first line before line switching and the second line after the line switching, in accordance with the switching address set in the setting step; and an output step of outputting image data for generating image data of one line based on image data corresponding to an effective area in the image data which is read out from the memory and burst-transferred in the data reading step.

Further features and aspects of the present invention will become apparent from the following description of exemplary embodiments, with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

[Image Forming Apparatus]

Figure 1:
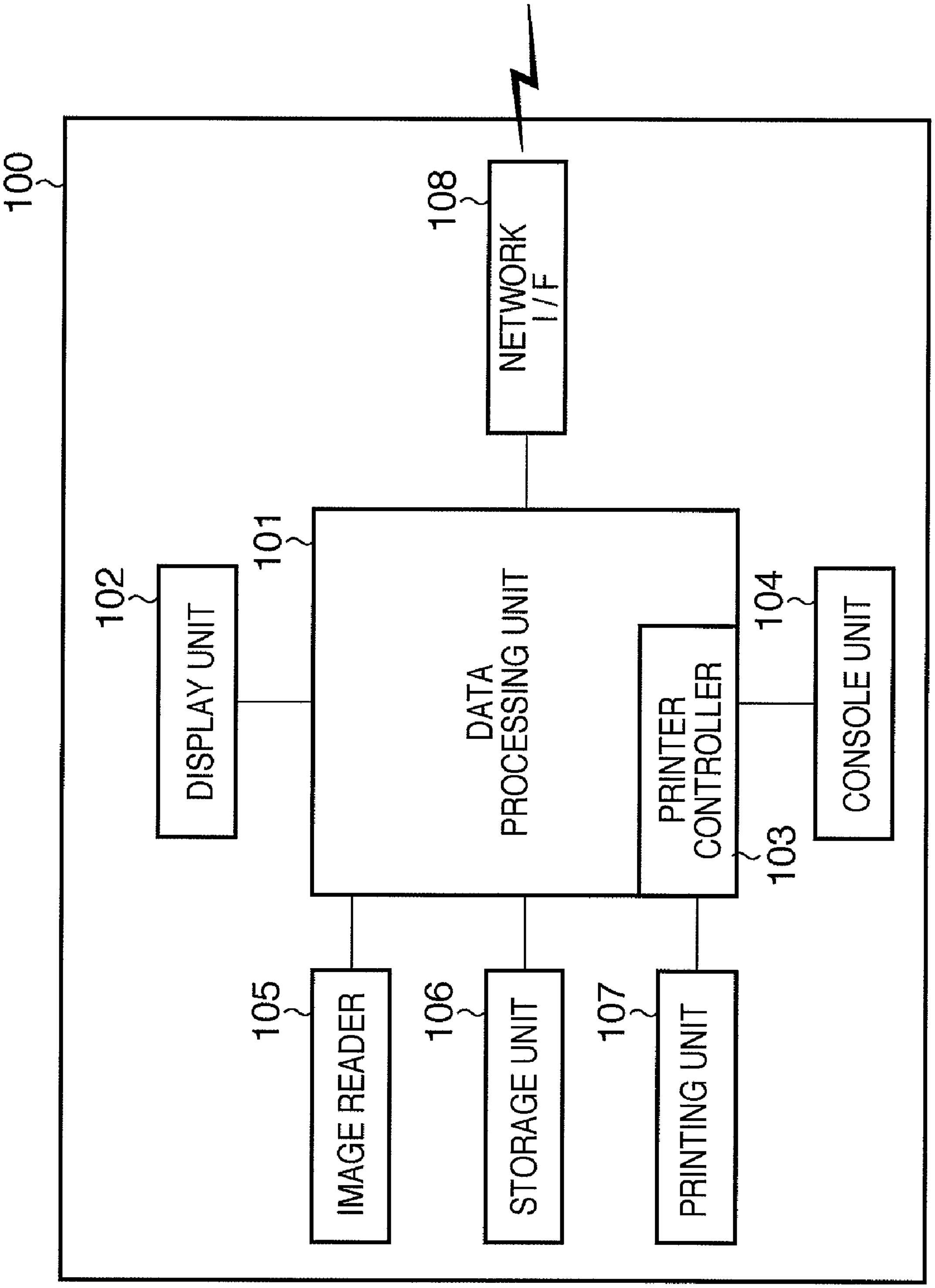
FIG. 1 is a block diagram for explaining the arrangement of a color image forming apparatus (multi function peripheral) according to an exemplary embodiment of the present invention.

FIG. 1 is a block diagram for explaining the arrangement of a color image forming apparatus (multi function peripheral) 100 according to an exemplary embodiment of the present invention.

The image forming apparatus 100 is implemented by, e.g., a multi function peripheral (MFP) which provides a plurality of types of functions. The image forming apparatus 100 is connected to a network via a network I/F 108, and can use the network to exchange image data and various kinds of information with an external device connected to the network.

In FIG. 1, an image reader 105 including an original table and auto document feeder (ADF) irradiates one or a bundle of original sheets on the original table with a light source, and forms a reflected image from the original sheet into an image on a solid image sensor (not shown) via a lens. The image reader 105 can obtain a raster image of each page at a predetermined density (e.g., 600 dpi) on the basis of a raster image signal output from the solid image sensor. In the embodiment, a paper document will be exemplified as an original read by the image reader 105. However, the image reader 105 may also read a printed material such as a print medium other than paper (including a transparent original (e.g., an OHP sheet or film) and cloth; to be referred to as a sheet hereinafter).

The image forming apparatus 100 has a copy function of printing, on a sheet by a printing unit 107, an image corresponding to an image signal obtained by the image reader 105. Especially when printing a copy of an original, a data processing unit 101 processes the image signal to generate print data and outputs it to the printing unit 107, and the printing unit 107 prints an image on a sheet in accordance with the print data. When printing copies of an original, print data is temporarily stored in a storage unit 106 such as an HD, and then output to the printing unit 107 by a designated number of copies, printing the print data on sheets by the designated number of copies. A printer controller 103 (image processing apparatus) executes various print control processes using the printing unit 107. In the embodiment, the printing unit 107 includes, e.g., the printer engine of a tandem type laser printer.

Figure 27:
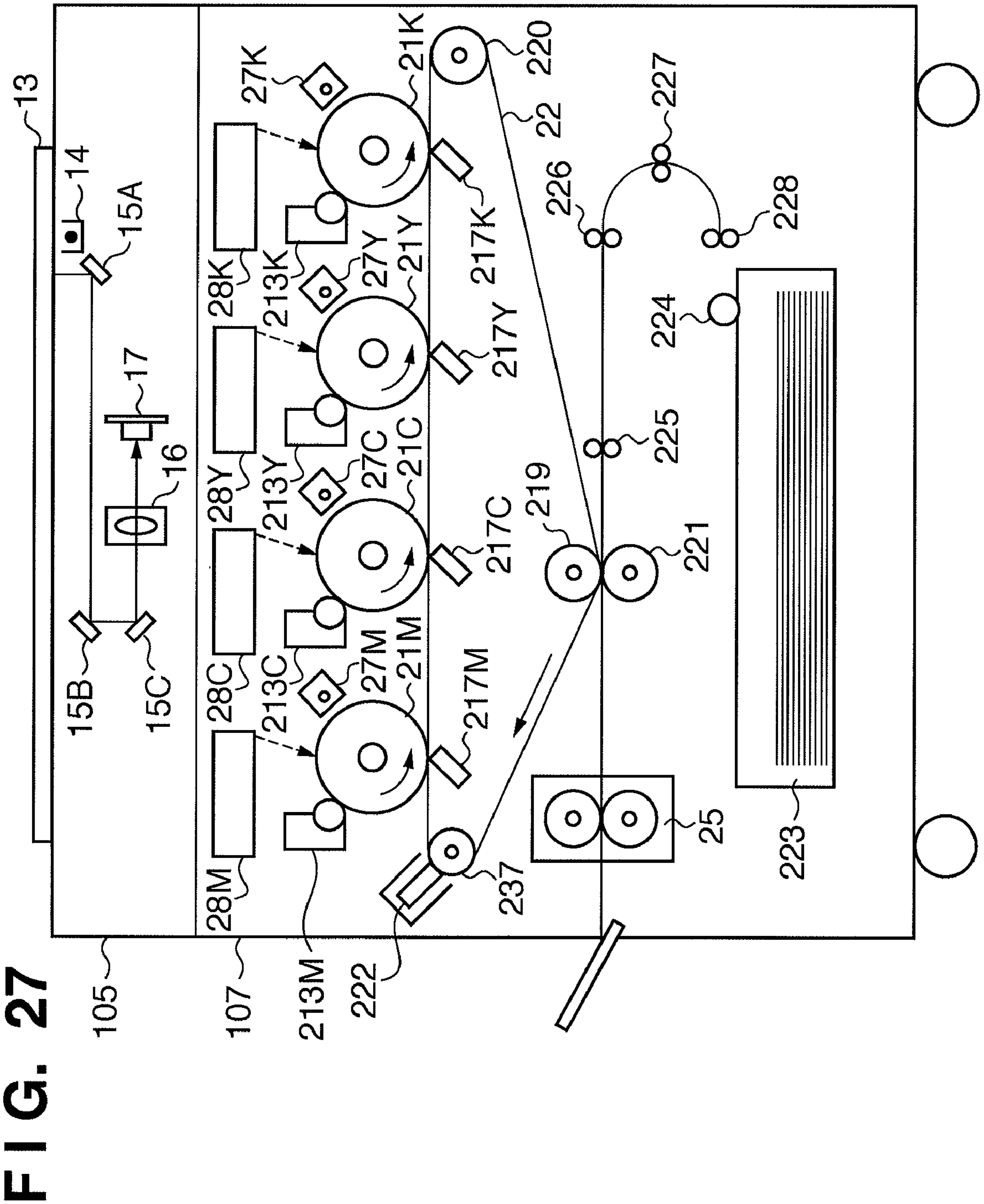
FIG. 27 depicts a sectional view of the schematic structure of a color copying machine having a tandem type laser printer according to the exemplary embodiments of the present invention.

FIG. 27 depicts a sectional view of the schematic structure of an image forming apparatus having a tandem type laser printer according to the embodiment of the present invention.

The image reader 105 forms an image of an original 13 on a color image sensor 17 via an illumination lamp 14, mirrors 15A to 15C, and a lens 16. The image reader 105 reads color image information of the original 13 for, e.g., R, G, and B color separated beams, and converts the pieces of color image information into electrical image signals. The data processing unit 101 performs color conversion processing on the basis of the strength levels of the R, G, and B color separated image signals obtained by the image reader 105, obtaining black (Bk), cyan (C), magenta (M), and yellow (Y) color image data.

The schematic structure of the printing unit 107 will be explained. In the printing unit 107, laser irradiation units 28M (for magenta), 28C (for cyan), 28Y (for yellow), and 28K (for black) arranged for toners of the respective colors convert color image data from the data processing unit 101 into optical signals. In accordance with the converted optical signals, electrostatic latent images corresponding to the image of the original 13 are formed on photosensitive drums 21M (for magenta), 21C (for cyan), 21Y (for yellow), and 21K (for black) arranged for the respective colors. Each of the photosensitive drums 21M, 21C, 21Y, and 21K rotates in a direction indicated by an arrow. The photosensitive drums are surrounded with chargers 27M (for magenta), 27C (for cyan), 27Y (for yellow), and 27K (for black), and an M developer 213M, C developer 213C, Y developer 213Y, and Bk developer 213K, respectively. In addition, an intermediate transfer belt 22 serving as an intermediate transfer member, and primary transfer bias blades 217M (for magenta), 217C (for cyan), 217Y (for yellow), and 217K (for black) for the respective colors are arranged. The intermediate transfer belt 22 is looped between a driving roller 220 driven to rotate by a driving motor (not shown), and driven rollers 219 and 237.

Images in the respective colors formed on the respective photosensitive drums are sequentially transferred onto the intermediate transfer belt 22 and superposed on each other (primary transfer), forming a color image on the intermediate transfer belt 22. The image formed on the intermediate transfer belt 22 is transferred onto a sheet (print medium) by a secondary transfer bias roller 221 (secondary transfer), forming the image on the sheet. A belt cleaning unit 222 cleans the belt 22 by removing toner which is not transferred to a sheet and remains on the belt 22.

A sheet for transferring an image is conveyed from a cassette 223 via a pickup roller 224 and conveyance rollers 226, 227, and 228, and stands by at the position of registration rollers 225. When the secondary transfer bias roller 221 comes into contact with the intermediate transfer belt 22, the registration rollers 225 rotate to feed the sheet to the secondary transfer bias roller 221 so that the toner image on the intermediate transfer belt 22 is transferred to a predetermined position on the sheet. To transfer, onto the sheet, the toner image on the intermediate transfer belt 22, a predetermined transfer bias is applied to the secondary transfer bias roller 221, transferring the toner image onto the sheet at once. The sheet bearing the toner image is conveyed to a fixing unit 25. The toner image is fused and fixed by upper and lower fixing rollers controlled to a predetermined temperature, obtaining a high-resolution full-color printed material.

The operator inputs an instruction to the image forming apparatus 100 via a console unit 104 of the image forming apparatus 100. A controller (a CPU 308 in FIG. 2) in the data processing unit 101 controls the series of operations. A display unit 102 displays the input state of the console unit 104, image data in process, and the like. The image forming apparatus 100 uses the display unit 102 and console unit 104 to implement a user interface which provides the user with various operations and displays for executing various processes (to be described later).

The detailed arrangement of the printer controller 103 will be explained with reference to FIG. 2.

Figure 2:
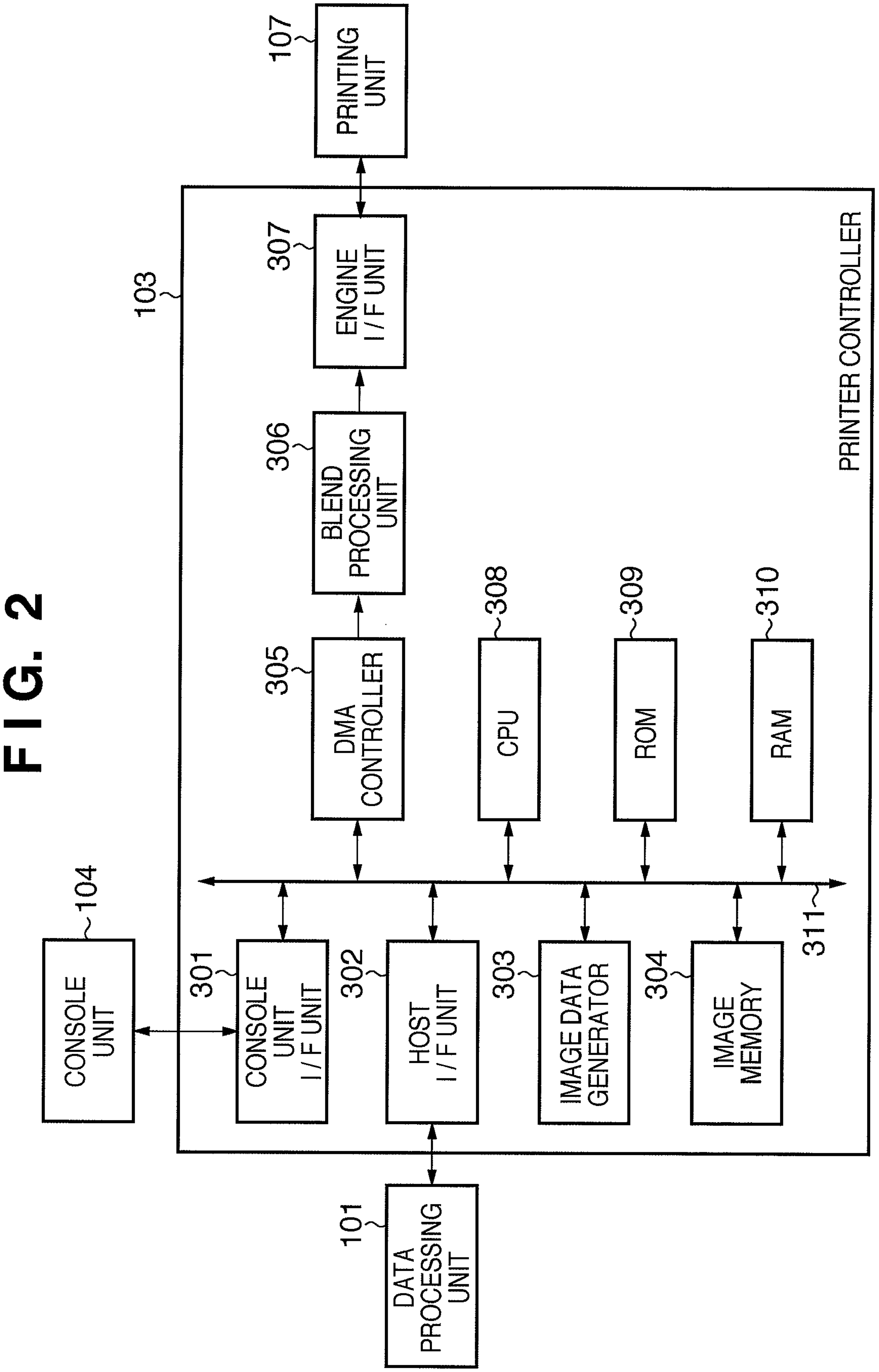
FIG. 2 is a block diagram showing the detailed arrangement of a printer controller according to the embodiment of the present invention.

FIG. 2 is a block diagram showing the detailed arrangement of the printer controller 103 according to the embodiment of the present invention. The same reference numerals as those in FIG. 1 denote the same parts, and a description thereof will not be repeated.

The printer controller 103 includes a host interface (I/F) unit 302. The host I/F unit 302 has an input buffer (not shown) for inputting print data sent from the data processing unit 101, and settings to designate the operation of the image forming apparatus 100. The host I/F unit 302 has an output buffer (not shown) for temporarily storing output data including a signal and device information data to be sent to the data processing unit 101. The host I/F unit 302 configures an input/output unit for a signal and communication packet transmitted/received to/from the data processing unit 101, and controls communication with the data processing unit 101.

Print data input via the host I/F unit 302 is supplied to an image data generator 303. The input print data is formed from, e.g., PDL (Page Description Language) data. The image data generator 303 uses a predetermined analysis unit to analyze input print data (e.g., PDL analysis processing). The image data generator 303 generates an intermediate language from the analysis result, and further generates bitmap image data processible by the printing unit (printer engine) 107.

More specifically, the image data generator 303 analyzes print data and creates intermediate language information on the basis of the analysis of an analyzer. In parallel to the creation of intermediate language information, the image data generator 303 performs rasterization processing. The rasterization processing includes a conversion from R G, and B display colors (additive process) contained in print data into Y, M, C, and K (subtractive process) processible by the printing unit 107. This processing also includes conversion from a character code contained in print data into font data such as a bit pattern or outline font stored in advance. Then, in the rasterization processing, bitmap image data is created for each page or band, and undergoes pseudo halftone processing using a dither pattern, generating bitmap image data printable by the printing unit 107. The created bitmap image data is stored in an image memory 304 capable of storing image data of at least a plurality of lines. A DMA controller 305 controls read of bitmap image data stored in the image memory 304. The DMA controller 305 controls read of bitmap image data from the image memory 304 on the basis of an instruction from the CPU 308.

Bitmap image data read out from the image memory 304 is processed by a blend processing unit 306 which performs blend processing (to be described later). The processed bitmap image data is transferred as a video signal to the printing unit 107 via an engine I/F unit 307. The engine I/F unit 307 includes an output buffer (not shown) for temporarily storing print data (video signal) to be transferred to the printing unit 107, and an input buffer (not shown) for temporarily storing a signal sent from the printing unit 107. The engine I/F unit 307 configures an input/output unit for a signal transmitted/received to/from the printing unit 107, and controls communication with the printing unit 107.

Various instructions such as an instruction associated with mode settings output by a user operation input via the console unit 104 are input via a console unit I/F unit 301. The console unit I/F unit 301 interfaces the console unit 104 and CPU 308. The CPU 308 controls the above-mentioned units in accordance with a mode designated from the console unit 104 or data processing unit 101. This control is executed by the CPU 308 in accordance with a control program stored in a ROM 309. The control program stored in the ROM 309 contains an OS for performing time-division control for each load module called a task in accordance with the system clock. The control program contains a plurality of load modules, execution of which is controlled for each function by the OS. A RAM 310 is used as a work area for arithmetic processing by the CPU 308. The respective units including the CPU 308 are connected to a system bus 311. The system bus 311 has an address bus, data bus, and control signal bus.

The detailed arrangement of the DMA controller 305 will be explained with reference to FIG. 3.

Figure 3:
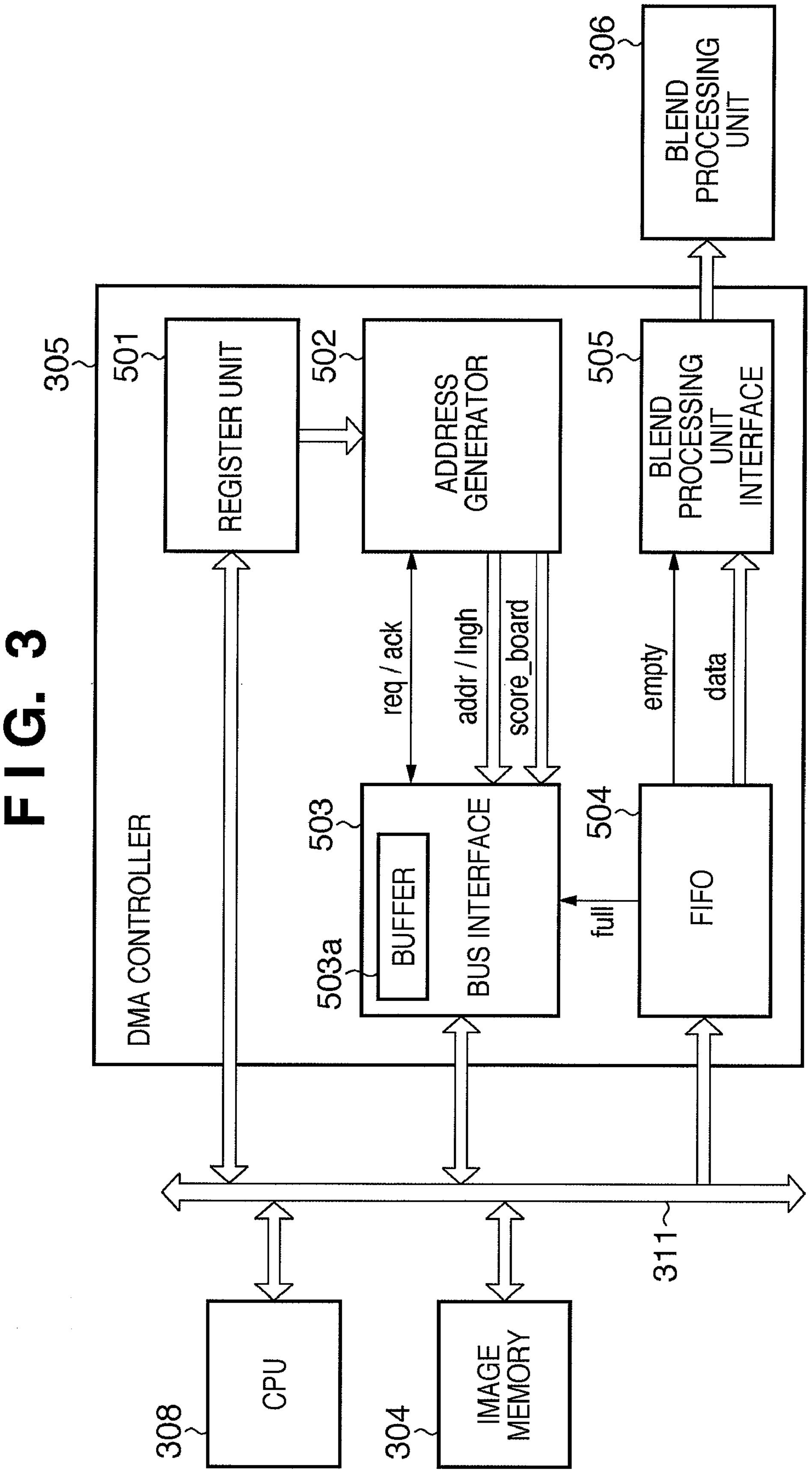
FIG. 3 is a block diagram showing the detailed arrangement of a DMA controller of the printer controller according to the embodiment of the present invention.

FIG. 3 is a block diagram showing the detailed arrangement of the DMA controller 305 of the printer controller 103 according to the embodiment of the present invention. The same reference numerals as those in FIG. 2 denote the same parts, and a description thereof will not be repeated.

A register unit 501 is formed from a plurality of registers (not shown). The CPU 308 issues an instruction to the DMA controller 305 by writing a proper value in each register of the register unit 501 by the CPU 308. An address generator 502 refers to the contents of the respective registers of the register unit 501 to generate an address for reading out bitmap image data stored in the image memory 304. The address generator 502 outputs, to a bus interface 503, an address signal addr, and a length signal lngh representing the length (amount) of data read out from the address. The address generator 502 outputs the address signal and length (read data length) signal to the bus interface 503 together with a request signal (req). Further, the address generator 502 outputs, to the bus interface 503, a score board signal (score_board) representing readout effect data on a scanning line.

Upon receiving the address signal and length signal (addr/lngh) from the address generator 502, the bus interface 503 issues a read transaction with the image memory 304 to the system bus 311. For example, when the data bus width of the system bus 311 is 32 bits, the bus interface 503 designates a burst length (burst transfer length) representing the count at which read of 32 bits is continuously repeated in response to the read request, and issues a read transaction. Upon completion of read processing for a pair of address and length signals, the bus interface 503 notifies the address generator 502 by an acknowledgement signal (ack) of the completion of the reading. Upon receiving the acknowledgement signal, the address generator 502 can issue the next read request to the image memory 304 by outputting the next pair of address and length signals to the bus interface 503.

Bitmap image data read out from the image memory 304 is temporarily stored in a buffer 503*a* in the bus interface 503. Immediately outputtable data is sent from the buffer 503*a* to a FIFO (data storage unit) 504 where the image data is stored. Even if a time period during which the blend processing unit 306 cannot receive image data at the moment is occurred, the DMA controller 305 reads out bitmap image data from the image memory 304 and stores it in the FIFO 504. Immediately when the blend processing unit 306 recovers to be able to receive data, the FIFO 504 can supply the bitmap image data (data) to the blend processing unit 306.

The bus interface 503 monitors a FIFO full signal (full) which is output from the FIFO 504 and represents that the FIFO 504 does not have a space to store data. When the full signal is output to represent that the FIFO 504 is full, the bus interface 503 does not issue a read transaction and waits until the full state is canceled.

A blend processing unit interface 505 sends bitmap image data stored in the FIFO 504 to the blend processing unit 306. The blend processing unit interface 505 monitors a FIFO empty signal (empty) which is output from the FIFO 504 and represents that no data is stored in the FIFO 504. When the FIFO 504 is not empty and the blend processing unit 306 can receive data, the blend processing unit interface 505 reads out bitmap image data from the FIFO 504, and sends it to the blend processing unit 306.

[Principle of Correction of Registration Errors]

The principle of correction of registration errors will be explained with reference to FIGS. 4A, 4B, and 5A to 5D.

FIGS. 4A, 4B, and 5A to 5D depict views explaining the principle of correction of registration errors according to the embodiment of the present invention.

Figure 4A:
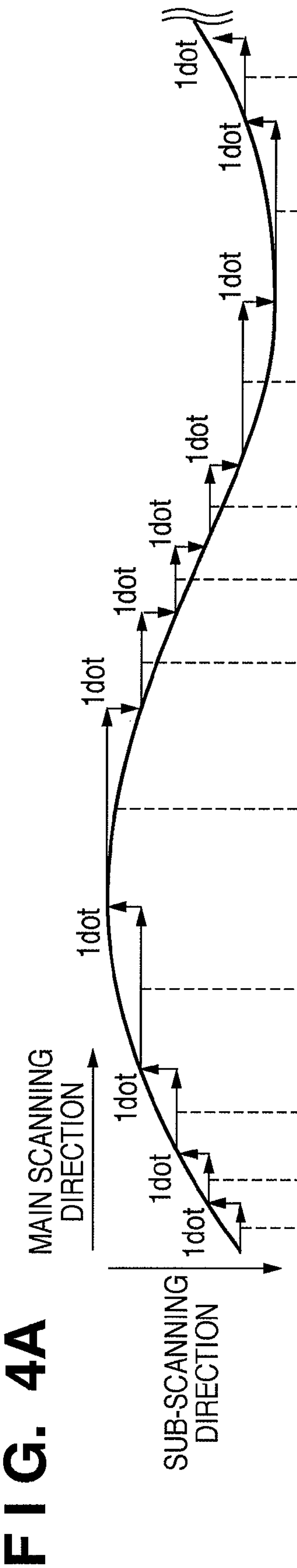
FIGS. 4A and 4B depict views illustrating an example of a registration error and its correction according to the embodiment of the present invention.
Figure 4B:
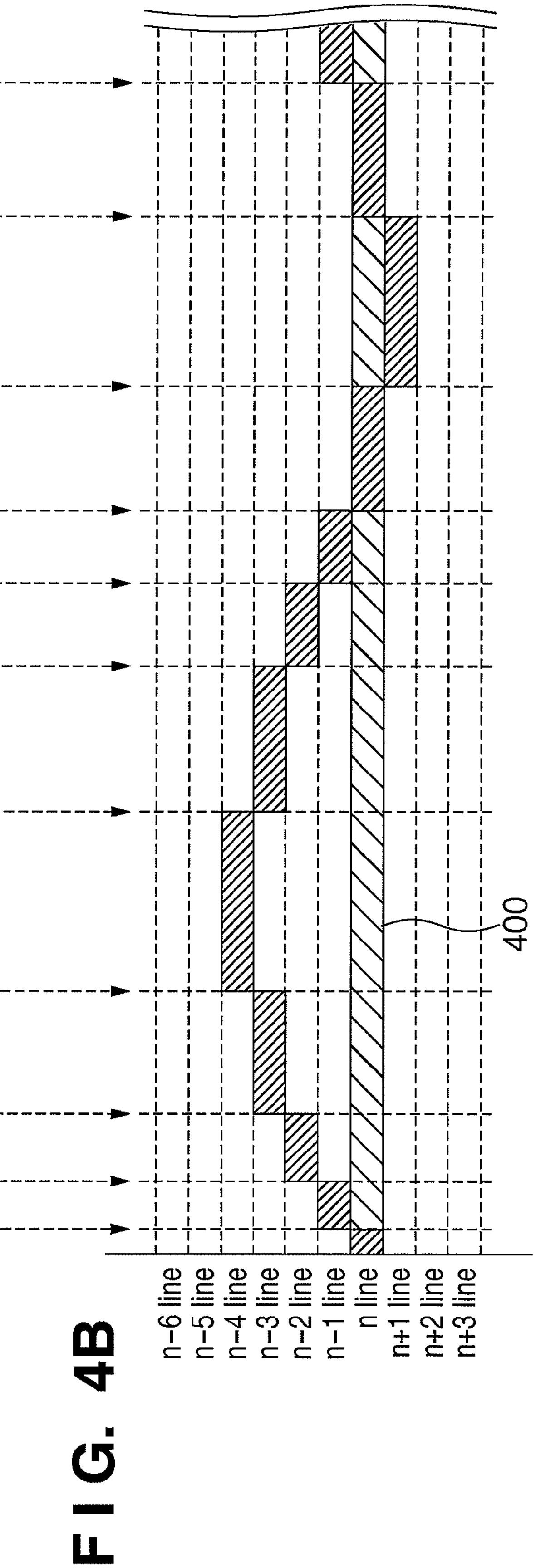

FIG. 4A depicts a view illustrating an example of the curvature of a scanning line in image formation that causes a registration error. In FIG. 4A, the abscissa axis represents the main scanning direction (line direction) of a scanning line, and the ordinate axis represents the sub-scanning direction. FIG. 4B shows a state in which bitmap image data is sent to the printing unit 107 while switching line data to one corresponding to each scanning line in accordance with the curvature of the scanning line. An n line 400 is a scanning line to be originally printed. In FIG. 4B, black portions represent line data to be sent to the printing unit 107 when printing the n line 400. In this manner, the line of data output to the printing unit 107 is switched in accordance with the curvature of the scanning line shown in FIG. 4A. Even if exposure scanning curves, an electrostatic latent image formed on an image carrier such as a photosensitive drum does not distort.

Figure 5A:
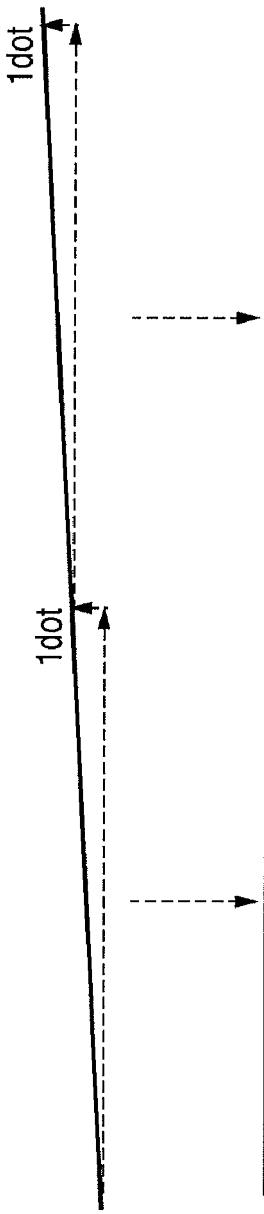
FIGS. 5A to 5D depict views illustrating an example of a registration error and its correction according to the embodiment of the present invention.
Figure 5B:
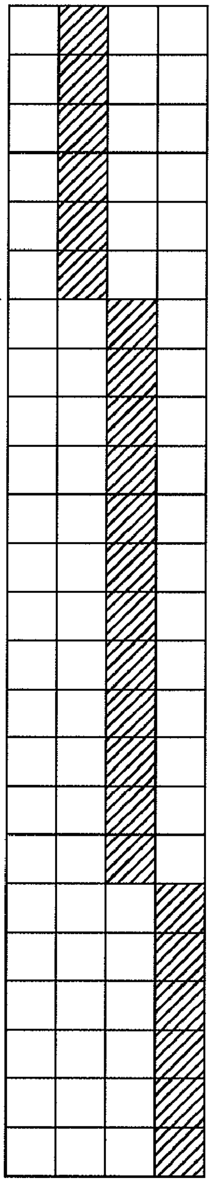
Figure 5C:
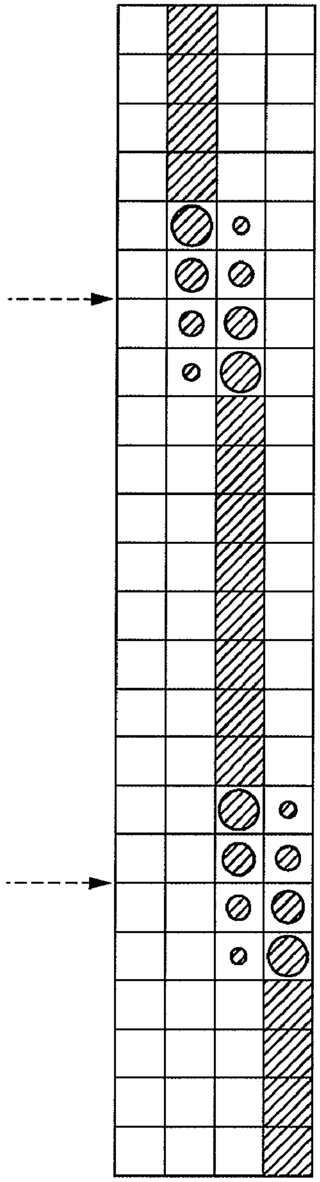
Figure 5D:
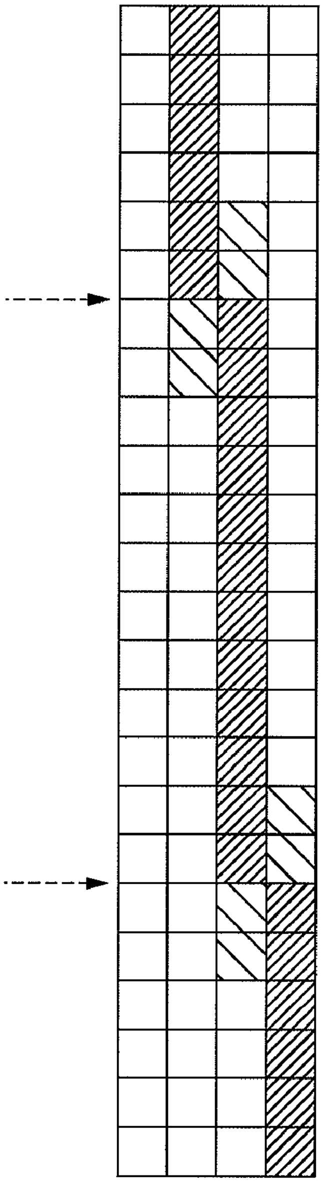

FIG. 5A depicts an enlarged view of part of a curved scanning line which causes a registration error. FIG. 5B depicts a view showing a state in which bitmap image data is sent to the printing unit 107 while switching the output line in accordance with the curvature of the scanning line. When the line of bitmap image data is simply switched to send the bitmap image data, as shown in FIG. 5A, an unnatural step appears at the switching portion. To prevent this, the dot size at the switching portion is changed to form dots so that two lines overlap each other, as shown in FIG. 5C. As a result, the unnatural step is canceled to smooth the image. In this way, a step is made less conspicuous by blending data of two, original and switching destination lines before and after the line switching portion (blend processing). The blend processing unit 306 executes this blend processing. Hatched portions in FIG. 5D represent dots to be processed by the blend processing unit 306.

The DMA controller 305 according to the embodiment generates an address to switch line data in accordance with the curvature of a scanning line in order to reduce the capacity of the line buffer. More specifically, the DMA controller 305 generates, based on the line switching address, the second read start address for reading out image data of the second line so as to read out image data by burst transfer of the first line before line switching and the second line after line switching. Bitmap image data necessary for the blend processing is only data of one preceding line. By paying attention to this, the blend processing unit 306 suffices to have only a buffer of a maximum of one line to execute blend processing.

First Embodiment

The operation of a DMA controller 305 according to the first embodiment of the present invention will be explained with reference to FIGS. 6 and 7.

Figure 6:
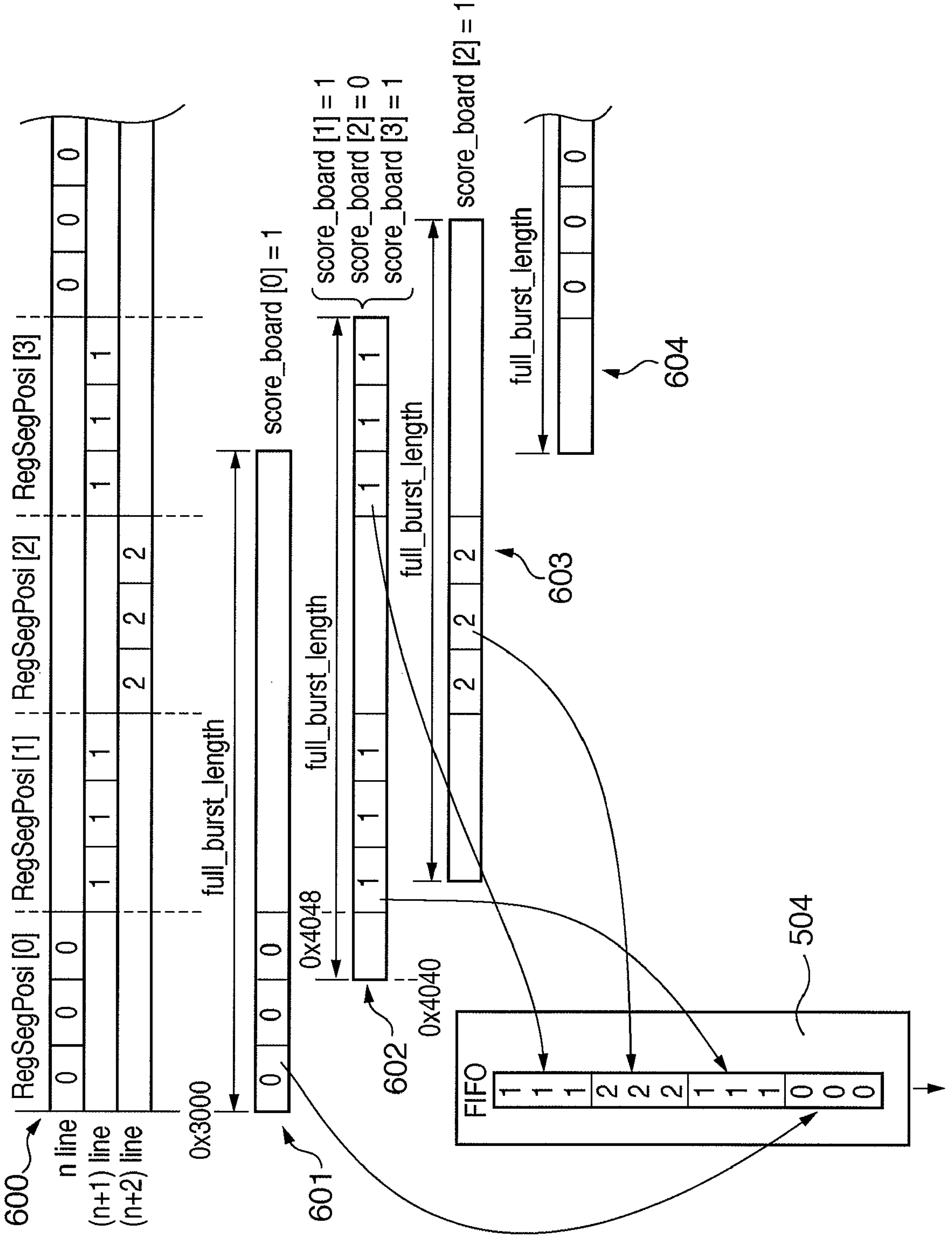
FIG. 6 depicts a view illustrating an example of the curvature of a scanning line and burst transfer by the DMA controller according to the first embodiment of the present invention.

FIG. 6 depicts a view explaining the curvature of a scanning line and burst transfer by the DMA controller 305 according to the first embodiment of the present invention. Assume that one scanning line of bitmap image data is equally divided. One divided bitmap image data will be called a segment. In the following description, the alphabetical names of a segment length, line switching information representing the number of lines which corresponds to the registration error amount of each segment from a reference line, various addresses, data length, and the like are the names of registers in a register unit 501. As described above, a CPU 308 instructs the DMA controller 305 on an operation by writing a value in each register of the register unit 501.

A register RegSegLen for setting the length of each segment is arranged in the register unit 501 of the DMA controller 305. A necessary number of registers RegSegPosi[i] which designate the registration error amount of each segment from a reference line in accordance with the curvature of a scanning line are arranged. The variable i (=0 to N) represents the number of the boundary of an appearing segment, i.e., the number of a segment. In the first embodiment, the value of the segment length RegSegLen is fixed in one scanning line.

In FIG. 6, reference numeral 600 denotes a state in which the scanning line deviates in the sub-scanning direction from an n line serving as a reference. Reference numeral 601 denotes a state in which data of the n line is read at a full burst length (full_burst_length). Reference numeral 602 denotes a state in which data of an (n+1) line is read at the full burst length. Similarly, reference numeral 603 denotes a state in which data of the (n+2) line is read at the full burst length. Reference numeral 604 denotes a state in which data of the n line is read at the full burst length after the fourth segment (Segment[3]).

The register unit 501 of the DMA controller 305 includes a register RegStartAddr which designates the start address of bitmap image data stored in an image memory 304, and a register RegLineLen representing the line length of bitmap image data. Further, the register unit 501 includes an address offset value RegLineOffset between adjacent lines of bitmap image data, and RegBeams which designates the number of lines to be sent to a blend processing unit 306. In addition to these registers, the register unit 501 of the DMA controller 305 includes an activation register (not shown) for starting the DMA operation upon completion of setting the registers by the CPU 308. In this arrangement, bitmap image data is stored in a FIFO 504 in an order as shown in FIG. 6. The downward direction is the direction of output from the FIFO 504.

Figure 7A:
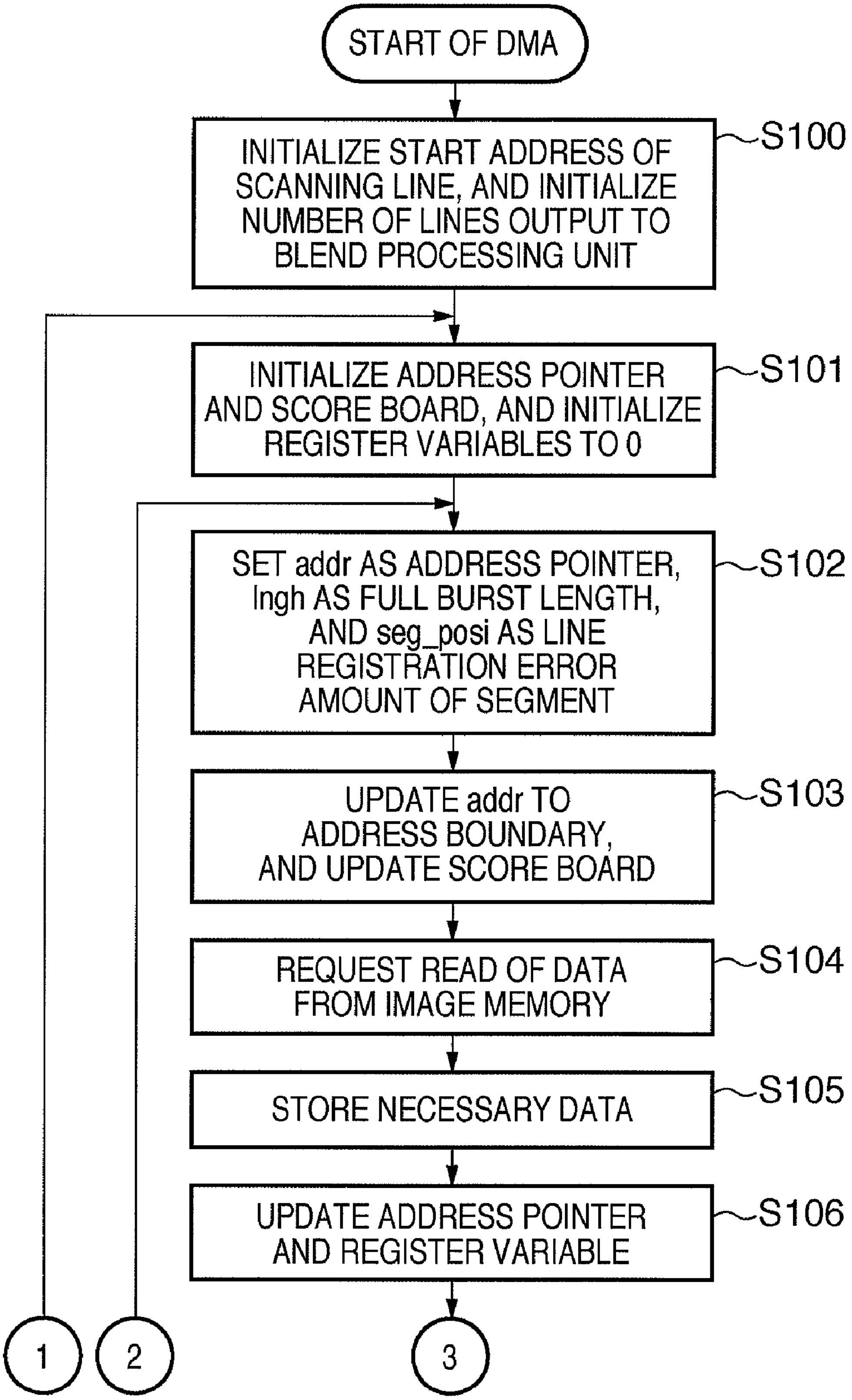
FIGS. 7A and 7B are flowcharts explaining the operation of the address generator of the DMA controller according to the first embodiment of the present invention.
Figure 7B:
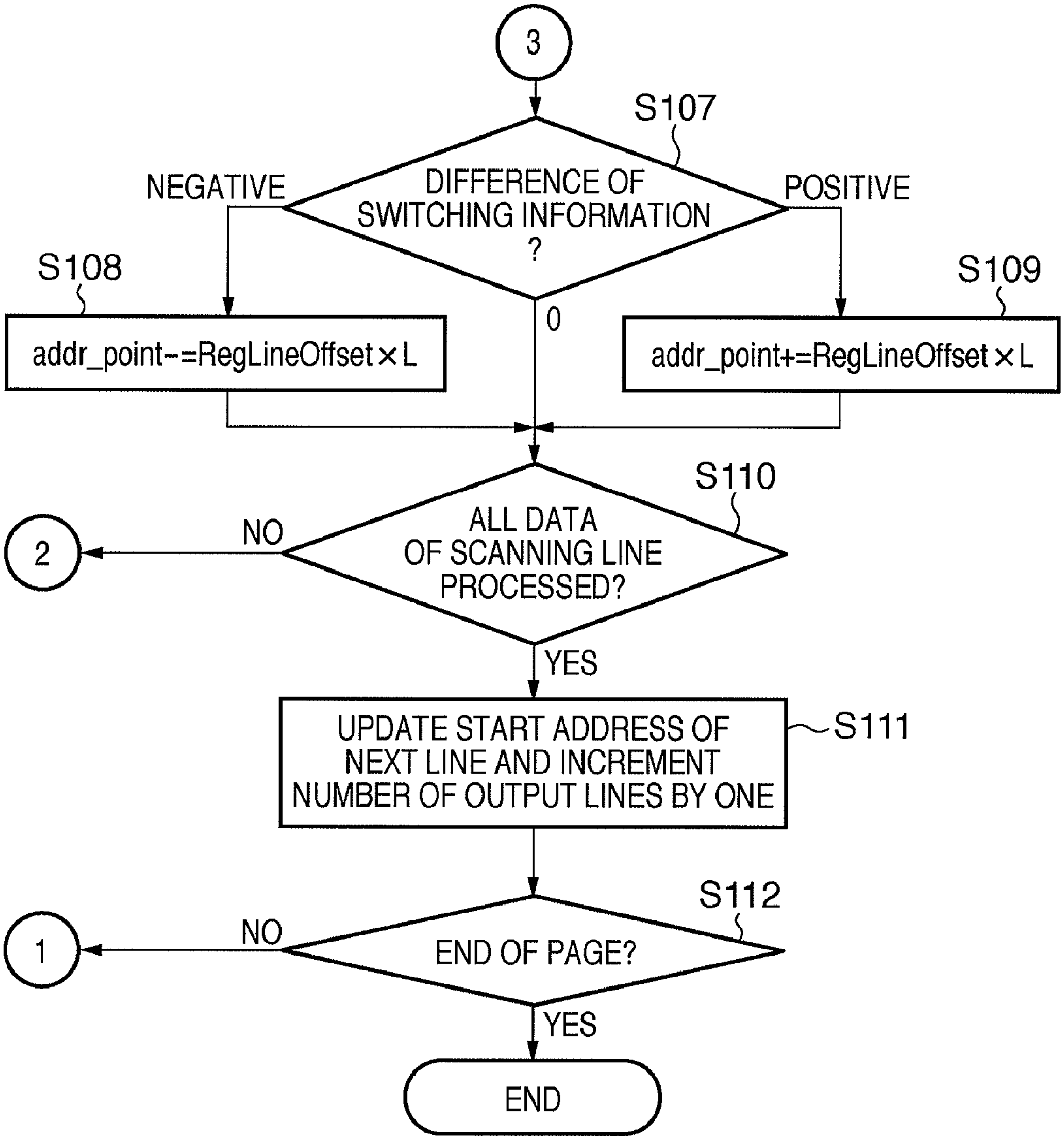

FIGS. 7A and 7B are flowcharts explaining the operation of an address generator 502 of the DMA controller 305 according to the first embodiment of the present invention. In the following description, the names of respective data and the like use corresponding register names for descriptive convenience.

In step S100, when the DMA operation starts in response to an instruction from the CPU 308, the start address line_start_addr of the scanning line is initialized to the value of the start address RegStartAddr of bitmap image data. The number line_cnt of lines sent to the blend processing unit 306 is initialized to "0". The process advances to step S101 to perform initialization for the scanning line. In this case, a read address pointer addr_point is initialized to the value of the start address line_start_addr of the scanning line. Effective segments score_board[0], score_board[1], . . . , score_board [N] each representing a segment which becomes effective on the scanning line to transfer data to the blend processing unit 306 are initialized to "0". score_board[i]="0" means that data of the i-th segment is not read out as effective image data. The effective segment score_board[i]="1" means that data of the i-th segment is read out as effective image data. The variables i (index) of the registers RegSegPosi[i] to be referred to is initialized to "0".

In step S102, initialization is done for each read request. In this case, an address addr and length signal lngh which are requested of a bus interface 503 are initialized to the read address pointer addr_point and full burst length full_burst_length, respectively. The full burst length includes a plurality of segment lengths. These signals may be changed in subsequent steps. The value of the register RegSegPosi[i] is set in the line registration error amount seg_posi of a segment corresponding to the start address.

The process advances to step S103 to mask the lower bit of the address addr so that read data can be burst-transferred even upon line switching which hinders effective burst transfer. As a result, the address addr is converted into an address which enables burst transfer at the full burst length full_burst_ length. For example, when the read start address of data is "0x4048" in 602 of FIG. 6, the lower bit of the address is masked to convert the start address into, e.g., an address "0x4040". In this fashion, the address addr is converted into an address which enables burst transfer at the full burst length. The address at which the segment switches is not always an address convenient for burst transfer. Thus, this address conversion is executed for efficient burst transfer at the full burst length full_burst_length. When a plurality of segments of image data are read out by one burst transfer, it is determined for each segment whether the image data is effective, and "1" is set in the effective segment score_board[i].

For example, when paying attention to image data of the (n+1) line in FIG. 6, "1" is set in both effective segments score_board[1] and score_board[3] corresponding to the second segment (RegSegPosi[1]) and fourth segment (RegSegPosi[4]) upon read at the full burst length. When reading out image data of the (n+1) line, the third segment does not have effective data, so "0" is kept set in the effective segment score_board[2].

The process advances to step S104 to output the address addr and read data length lngh (full burst length in this case) to the bus interface 503 and request it to read out bitmap image data from the image memory 304. In step S105, image data of segments of the readout bitmap image data, for which the value of the effective segment score_board[i] is "1, is temporarily stored in a buffer 503$a$ of the bus interface 503 in the order of the segments. The buffer 503*a* has a capacity enough to store data read out at the full burst length. Items of image data stored in the buffer 503*a* are output to the FIFO 504 in the order of the segments (sequentially from the left side of the scanning line). In step S105, the readout items of data in 602 of FIG. 6 contain image data of the second and fourth segments. However, read of data of the third segment between the second and fourth segments is not completed yet, so image data of the fourth segment is stored in the buffer 503*a* after reading out data of the (n+2) line in 603. Hence, as shown in FIG. 6, items of image data to be printed by the scanning line are stored in the FIFO 504 in the order of the segments.

The process advances to step S106, and when ack is received from the bus interface 503, the position of image data which has not been read out on the scanning line is determined based on the value of the effective segment score_board[i] in order to update the read address pointer addr_point and variable i. Then, a segment corresponding to the next read address is calculated, the variable i is incremented by the calculation result M, and (+RegSegLen×M) is set in the address pointer addr_point.

The address pointer addr_point is initialized to the start address line_start_addr of the scanning line at the beginning, and is “0x3000” when reading out image data of the n line in 601 of FIG. 6. After reading out image data of the n line, the effective segment score_board[0] is “1”, but both the effective segments score_board[1] and score_board[2] remain “0”. From the value of the effective segment score_board[i], the second segment RegSegPosi[1] is specified as the position of image data which has not been read out. In order to advance the address pointer addr_point to an immediately preceding segment, (RegSegLen×1) is added to the address pointer addr_point.

In step S107, the next RegSegPosi[i] is compared with the preceding RegSegPosi[i-M] to calculate the difference of switching information. The difference of switching information represents the number of lines by which the scanning line is switched. For example, when switching data represented by 601 to that represented by 602, the scanning line is switched from the n line to the (n+1) line, and the difference of switching information is the number L of lines=1. If the difference L of switching information is negative, the process advances to step S108; if it is positive, to step S109. If the difference L of switching information is “0”, the process advances to step S110. In step S108, the scanning line is switched to an upper line in 600 of FIG. 6, so the line offset RegLineOffset×L is subtracted from the address pointer addr_point. To the contrary, in step S109, the scanning line is switched to a lower line in 600 of FIG. 6, so RegLineOffset×L is added to the address pointer addr_point. After executing step S108 or S109, the process advances to step S110.

In step S110, it is determined by referring to the effective segment score_board[i] representing readout effective data on the scanning line, whether or not all items of image data to be printed by the scanning line have been read out. In this case, after reading out effective data from respective segments, “1” is set in the effective segments score_board[0], score_board[1], . . . , score_board[N]. In the example of FIG. 6, “1” is set in the effective segments score_board[0], score_board[1], and score_board[3] after reading out data in 601 and 602. The values of the remaining score_board[i] including score_board[2] remain “0”. After reading out image data represented by 603, “1” is set in score_board[2]. Similarly, after reading out image data represented by 604, “1” is set in score_board[4]. After “1” is set in all the effective segments score_board[0], score_board[1], . . . , score_board[N] for one scanning line, the process advances from step S110 to step S111. If read of the scanning line has not been completed, the process returns to step S102 to repeat the above-described read processing.

In step S111, each data is updated to process the next line data. In this case, the address offset value RegLineOffset between adjacent lines of bitmap image data is added to the start address line_start_addr of each line to set the start address of the next line. Also, the number line_cnt of lines output to the blend processing unit 306 is incremented by one. In step S112, the number line_cnt of output lines is compared with the number RegBeams of lines to be sent to the blend processing unit 306. If the number line_cnt of output lines is smaller than the total number RegBeams of lines to be sent, it is determined that line data to be processed still remains. Thus, the process returns to step S101 to repeat the above-described line processing. If the number line_cnt of output lines is equal to or larger than the total number RegBeams of lines to be sent, data processing for one page has ended, and the DMA operation ends. At the end of the DMA operation, the DMA controller 305 notifies the CPU 308 by an interrupt signal (not shown) that the DMA operation has ended. The CPU 308 detects the interrupt to detect that the DMA transfer has ended.

As described above, the DMA controller 305 reads out image data of one scanning line formed by a plurality of data segments, and transfers the image data from the image memory 304 to a printing unit 107. The printing unit 107 scans a photosensitive drum (image carrier) with a laser beam on the basis of image data of one scanning line, forming an electrostatic latent image of one scanning line on the photosensitive drum. The electrostatic latent image is an image which is generated on the photosensitive drum by irradiating (scanning), with a laser beam, the photosensitive drum charged to a predetermined potential, and has a potential difference corresponding to image data. The printing unit 107 applies toner to the electrostatic latent image to form a toner image corresponding to the potential difference on the photosensitive drum. Further, the printing unit 107 transfers the toner image onto a sheet to form the image on the sheet.

In the above-described example, the DMA controller 305 controls data transfer according to the first embodiment. Alternatively, the CPU 308 may also control the data transfer if it has a margin for the processing time. The data transfer may also be implemented under the control of a CPU other than the CPU 308, a DSP (Digital Signal Processor), or the like. Further, when a color image forming apparatus as shown in FIG. 27 includes image forming units corresponding to respective colors (C, Y, M, and K), the data transfer according to the first embodiment is executed for the image forming units of the respective colors, preventing color misregistration caused by the registration errors of the respective colors. This also applies to the following embodiments.

As described above, even when the scanning line curves for each color, the first embodiment can prevent color misregistration caused by the registration errors of the respective colors without arranging as many line buffers as the registration error amounts of the respective colors. By arranging a line buffer having a capacity of one line, blend processing can be executed upon switching each line, thereby making less conspicuous a step generated upon the line switching.

Second Embodiment

The operation of a DMA controller 305 according to the second embodiment of the present invention will be explained with reference to FIGS. 8 and 9. The hardware configuration of an image forming apparatus according to the second embodiment is the same as that in the first embodiment, and a description thereof will not be repeated. In the second embodiment, unlike the first embodiment, the value of the segment length RegSegLen of one scanning line is variable.

Figure 8:
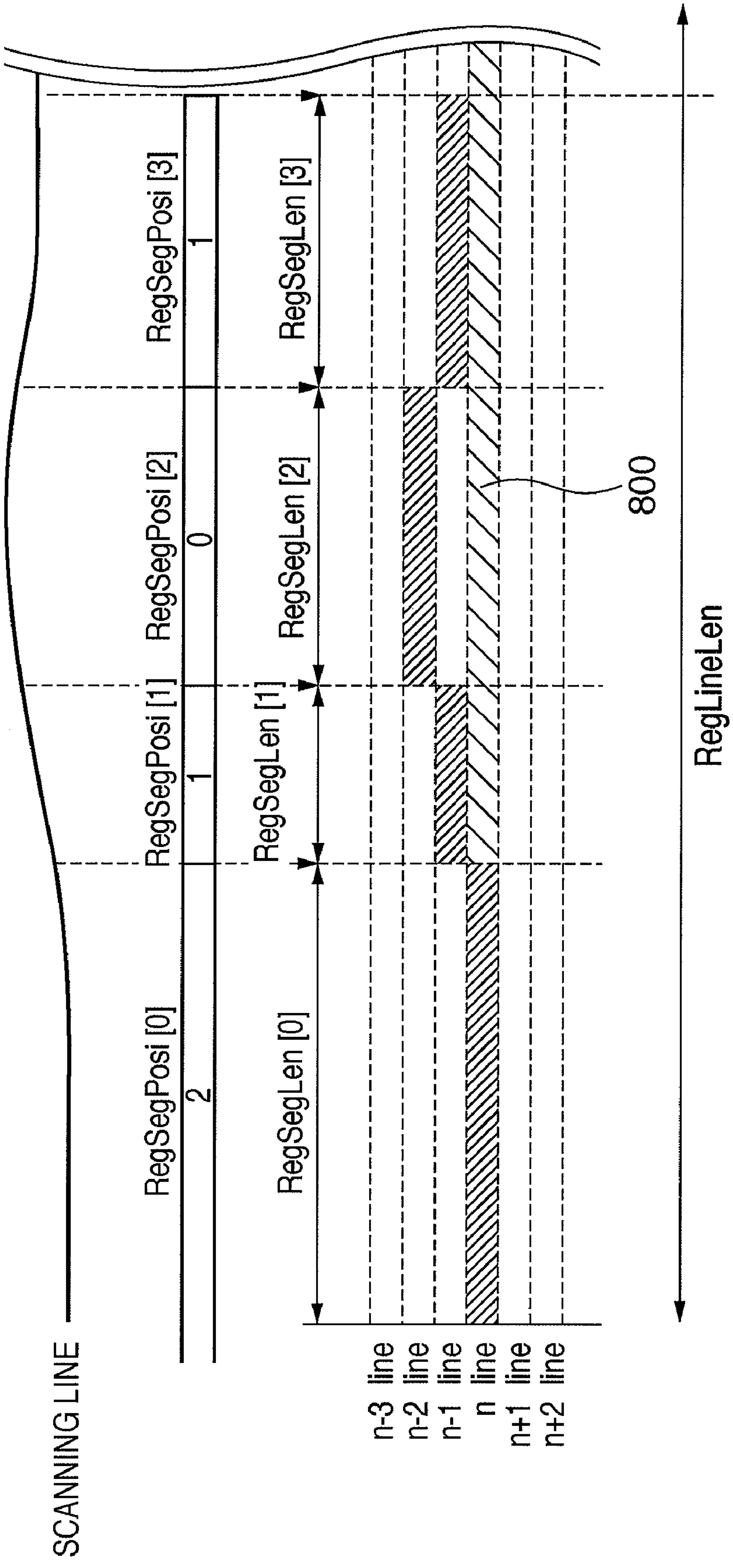
FIG. 8 depicts a view illustrating an example of a method of instructing a DMA controller on the curvature of a scanning line according to the second embodiment of the present invention.

FIG. 8 depicts a view explaining a method of instructing the DMA controller 305 on the curvature of a scanning line according to the second embodiment of the present invention.

Registers RegSegPosi[i] which designate a length (segment length) till the line switching position in accordance with the curvature of a scanning line are provided. The length of each segment is not fixed, and the boundary of each segment is a position where line switching occurs. A necessary number of registers RegSegPosi[i] which designate the registration error amount of each segment from a reference line are arranged in a register unit 501 of the DMA controller 305. A start address RegStartAddr of bitmap image data stored in an image memory 304, and a length RegLineLen of each scanning line of bitmap image data are further set in the register unit 501 of the DMA controller 305. Also, an address offset value RegLineOffset between adjacent line data of bitmap image data, and the number RegBeams of lines to be sent to a blend processing unit 306 are set in the register unit 501. The register unit 501 of the DMA controller 305 also includes an activation register (not shown) for starting the DMA operation upon completion of setting the register values by a CPU 308.

Figure 9A:
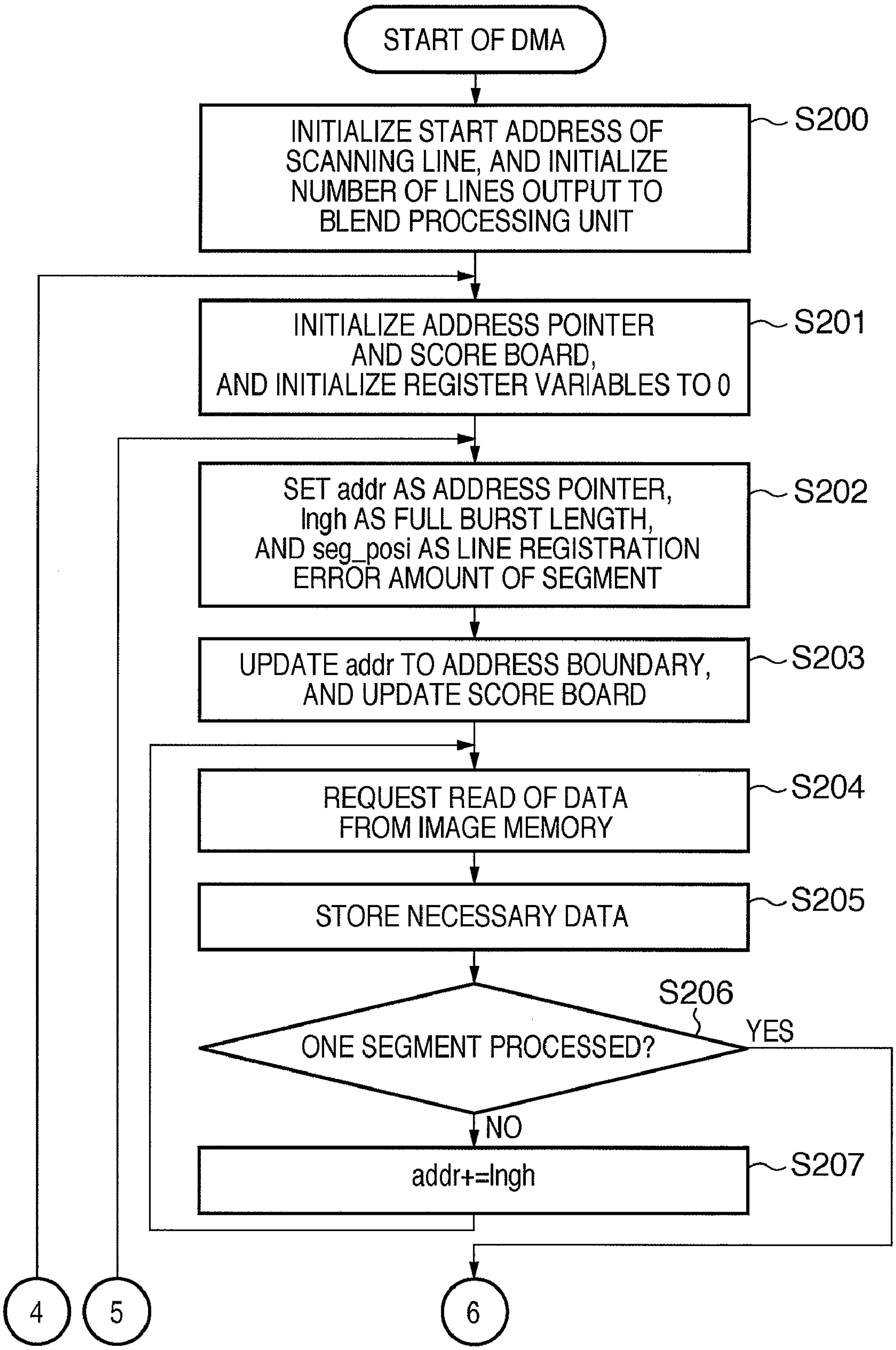
FIGS. 9A and 9B are flowcharts explaining the operation of the address generator of the DMA controller according to the second embodiment of the present invention.
Figure 9B:
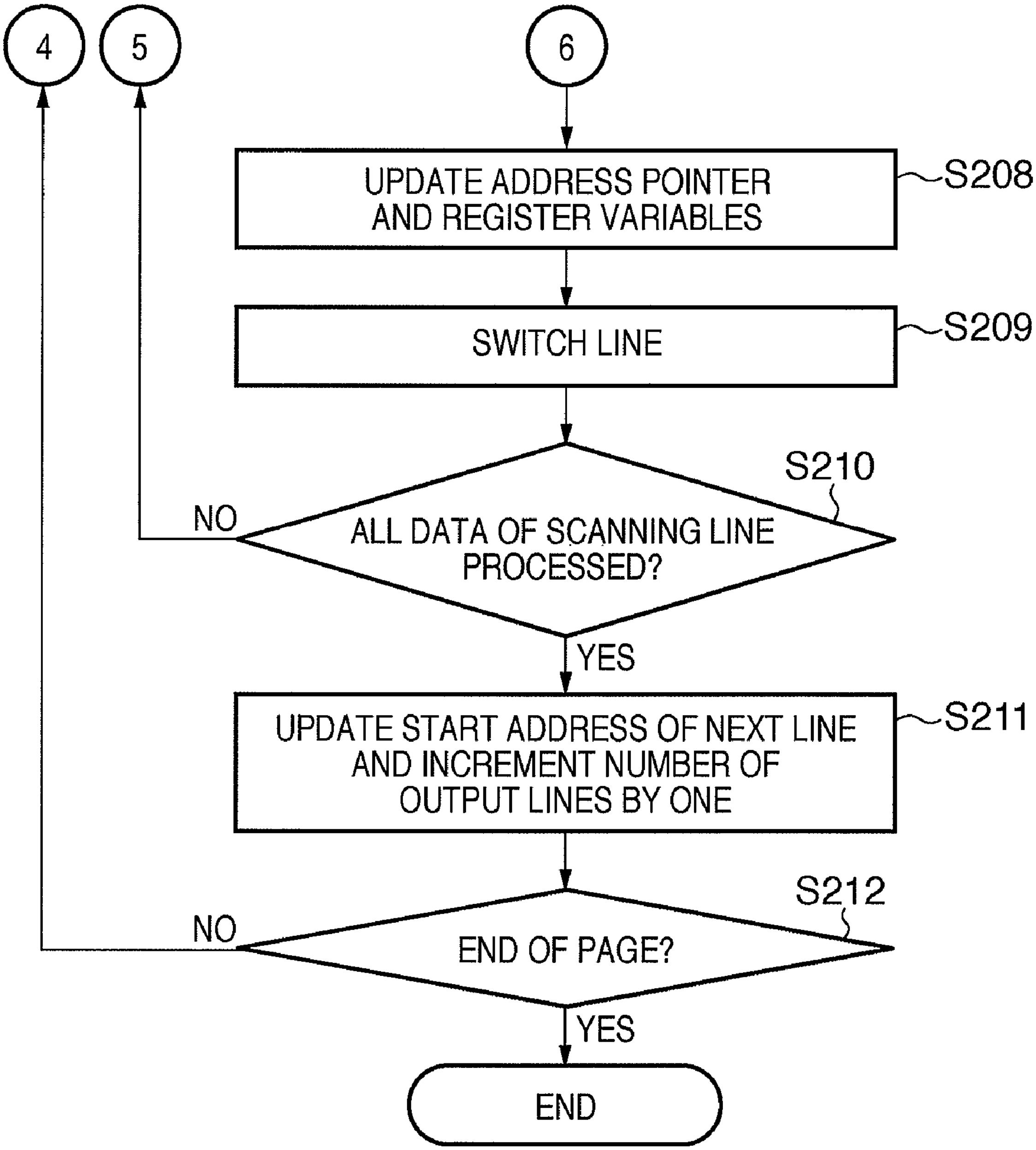

FIGS. 9A and 9B are flowcharts explaining the operation of an address generator 502 of the DMA controller 305 according to the second embodiment of the present invention.

In step S200, when the DMA operation starts in response to an instruction from the CPU 308, the start address line_start_addr of the scanning line is initialized to the value of the start address RegStartAddr of bitmap image data in the image memory 304. The number line_cnt of lines sent to the blend processing unit 306 is initialized to "0". In step S201, initialization is performed for each line. A read start address addr_point is initialized to the value of the start address line_start_addr of the scanning line. An effective segment score_board[i] representing effective data on the scanning line that has been transferred to the blend processing unit 306 is initialized. The variable i representing the indices of the registers RegSegPosi[i] to be referred to and RegSegPosi[i] is initialized to "0".

The process advances to step S202 to perform initialization for each read request. An address addr and data length lngh which are requested of a bus interface 503 are initialized to the read address pointer addr_point and full burst length full_burst_length, respectively. These signals are changed in subsequent steps. The value of the register RegSegPosi[i] is set in the line registration error amount seg_posi of a segment corresponding to the read start address.

The process advances to step S203 to mask the lower bit of the address addr and set an address boundary which enables burst transfer, similar to step S103. In this case, "1" is set in the effective segment score_board[i] corresponding to the segment length RegSegLen[i].

The process advances to step S204 to output the address addr and data length lngh (burst length) to the bus interface 503 and request it to read out bitmap image data from the image memory 304. In step S205, similar to the above-described step S105 in FIG. 7A, items of image data corresponding to the effective segment score_board[i]="1" are sequentially extracted and temporarily stored in a data buffer 503*a* of the bus interface. The items of image data stored in the buffer 503*a* are output to the FIFO 504 in the order of scanning lines. The data buffer 503*a* has a capacity enough to store image data read out at the full burst length.

In the second embodiment, the length of each segment is variable, and the full burst length full_burst_length is sometimes shorter than the segment length RegSegLen[i]. At this time, a transaction request needs to be issued a plurality of number of times for one segment length. In step S206, it is determined by referring to the address addr and data length lngh whether one segment of RegSegLen[i] has been processed in response to the read request. If the read of the segment has not been completed and ack is received from the bus interface 503, the data length lngh is added to the address addr to update the address addr in step S207. In this way, bitmap image data, read of which has not been completed, can be read out. Upon completion of reading out each segment, the process advances to step S208.

In step S208, if ack is received from the bus interface 503, the position of a segment which has not been read out is determined based on the value of the effective segment score_board[i] in order to update the read address pointer addr_point and variable i. Then, the start of the segment is set in the next read address pointer addr_point.

The process advances to step S209 to add {(the difference between the current segment (RegSegPosi[i]) and the next segment (RegSegPosi[i+1]))×RegLineOffset} to the address pointer addr_point. The variable i is incremented by one to switch the read line to the next one.

This will be explained with reference to the example of FIG. 8. When reading out image data to be printed on an n line 800, assume that double the full burst length equals RegSegLen[0]. "1" is set in the effective segment score_board[0], and half the data of segment 0 is stored in the buffer 503*a* for one read request. To read out all the image data of segment 0, the address is updated by adding the burst length to it (S207). To read out data of segment 1, the start address of segment 1 is obtained by (the difference between RegSegPosi[0] and the next segment RegSegPosi[1])×RegLineOffset.

Then, the process advances to step S210, and whether all image data of the line have been read out is determined by referring to the effective segment score_board[i] representing readout effective image data on the scanning line, similar to step S110 in FIG. 7B. If read of the scanning line has not been completed, the process returns to step S202 to repeat the above-described read processing. If read of the scanning line has been completed, the process advances to step S211 to update each data in order to process the next line data. In this case, the address offset value RegLineOffset between adjacent lines of bitmap image data is added to the start address line_start_addr of each line to set the start address of the next line. Also, the number line_cnt of lines output to the blend processing unit 306 is incremented by one. In step S212, the number line_cnt of output lines is compared with the number RegBeams of lines to be sent to the blend processing unit 306. If the number line_cnt of output lines is smaller than the total number RegBeams of lines to be sent, line data to be processed still remains. Thus, the process returns to step S201 to repeat the above-described line processing. If the number line_cnt of output lines is equal to or larger than the total number RegBeams of lines to be sent, processing of image data of one page has been ended, and the DMA operation ends. At the end of the DMA operation, the DMA controller 305 notifies the CPU 308 by an interrupt signal (not shown) that the DMA operation has ended. The CPU 308 detects the interrupt to detect that the DMA transfer has ended.

As described above, in addition to the effects of the first embodiment, the second embodiment can prevent color misregistration caused by the registration errors of respective colors by changing the length of each segment in accordance with the curvature of a scanning line.

Third Embodiment

The operation of a DMA controller 305 according to the third embodiment of the present invention will be explained with reference to FIGS. 10A, 10B, 11, and 12. The hardware configuration of an image forming apparatus according to the third embodiment is the same as that in the first embodiment except for the DMA controller 305, and a description thereof will not be repeated.

Figure 10A:
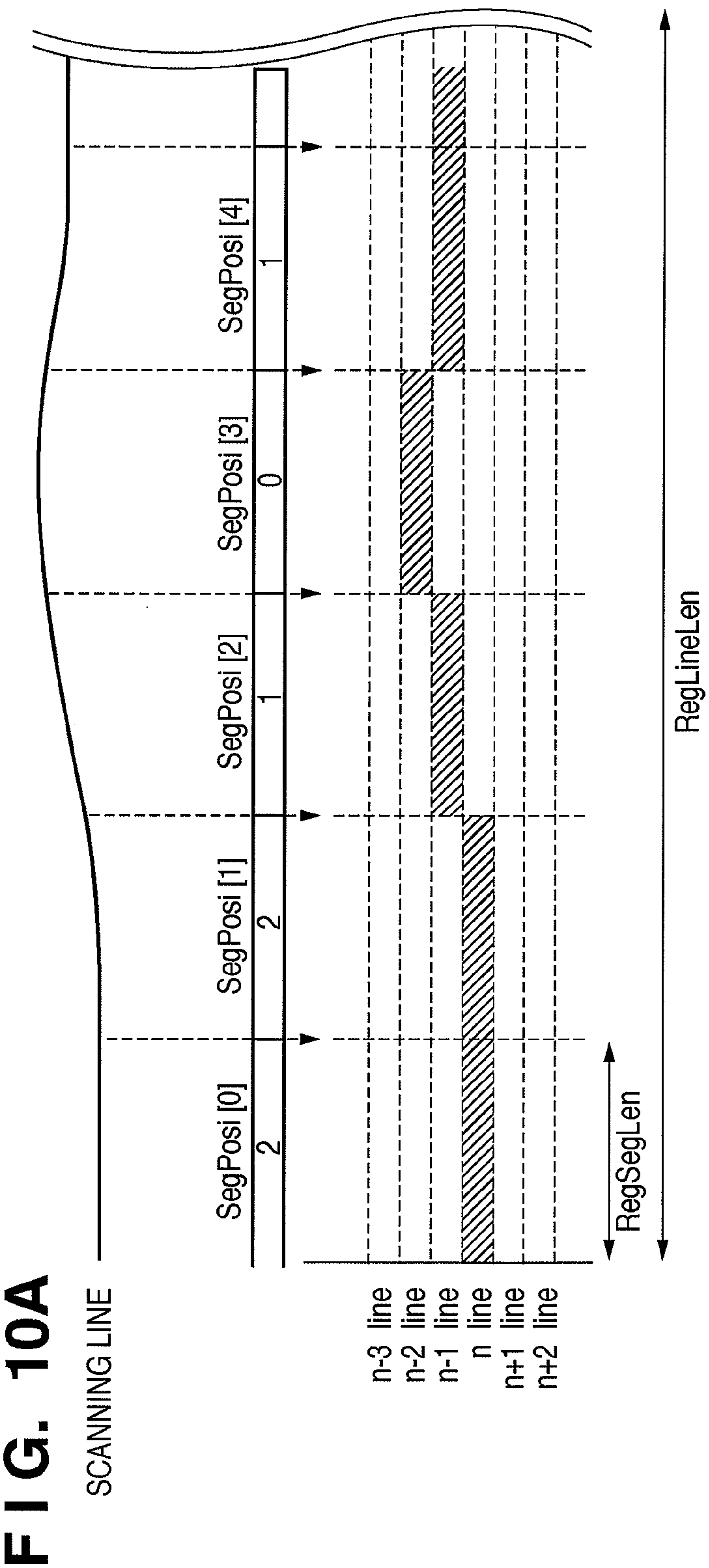
FIGS. 10A and 10B depict a view illustrating an example of a method of instructing a DMA controller on the curvature of a scanning line according to the third embodiment of the present invention, and a view showing a state in which information SegPosi[i] is stored as a table, respectively.

FIG. 10A depicts a view explaining a method of instructing the DMA controller 305 on the curvature of a scanning line according to the third embodiment of the present invention. Assume that one line of bitmap image data is equally divided, similar to the first embodiment. The length RegSegLen of each segment is set in a register unit 501 of the DMA controller 305. Unlike the first embodiment, the third embodiment adopts switching information SegPosi[i] representing the number of lines which corresponds to the registration error amount of each segment from a reference line in accordance with the curvature of a scanning line. The variable i represents the order of the boundary of a segment.

Figure 10B:
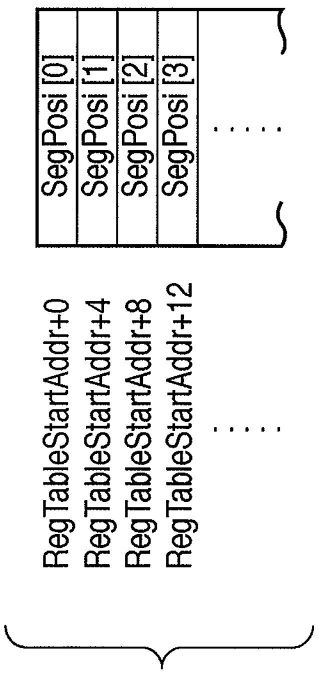

FIG. 10B shows a state in which the information SegPosi[i] is stored as a table in an image memory 304 or RAM 310.

A start address RegTableStartAddr in the table is set in the register unit 501 of the DMA controller 305. The start address RegStartAddr of bitmap image data stored in the image memory 304, and the line length RegLineLen of bitmap image data are further set in the register unit 501 of the DMA controller 305. Also, the register unit 501 of the DMA controller 305 includes an address offset value RegLineOffset between adjacent lines of bitmap image data, and the number RegBeams of lines to be sent to a blend processing unit 306. The register unit 501 of the DMA controller 305 further includes an activation register (not shown) for starting the DMA operation upon completion of setting the register values by a CPU 308.

Figure 11:
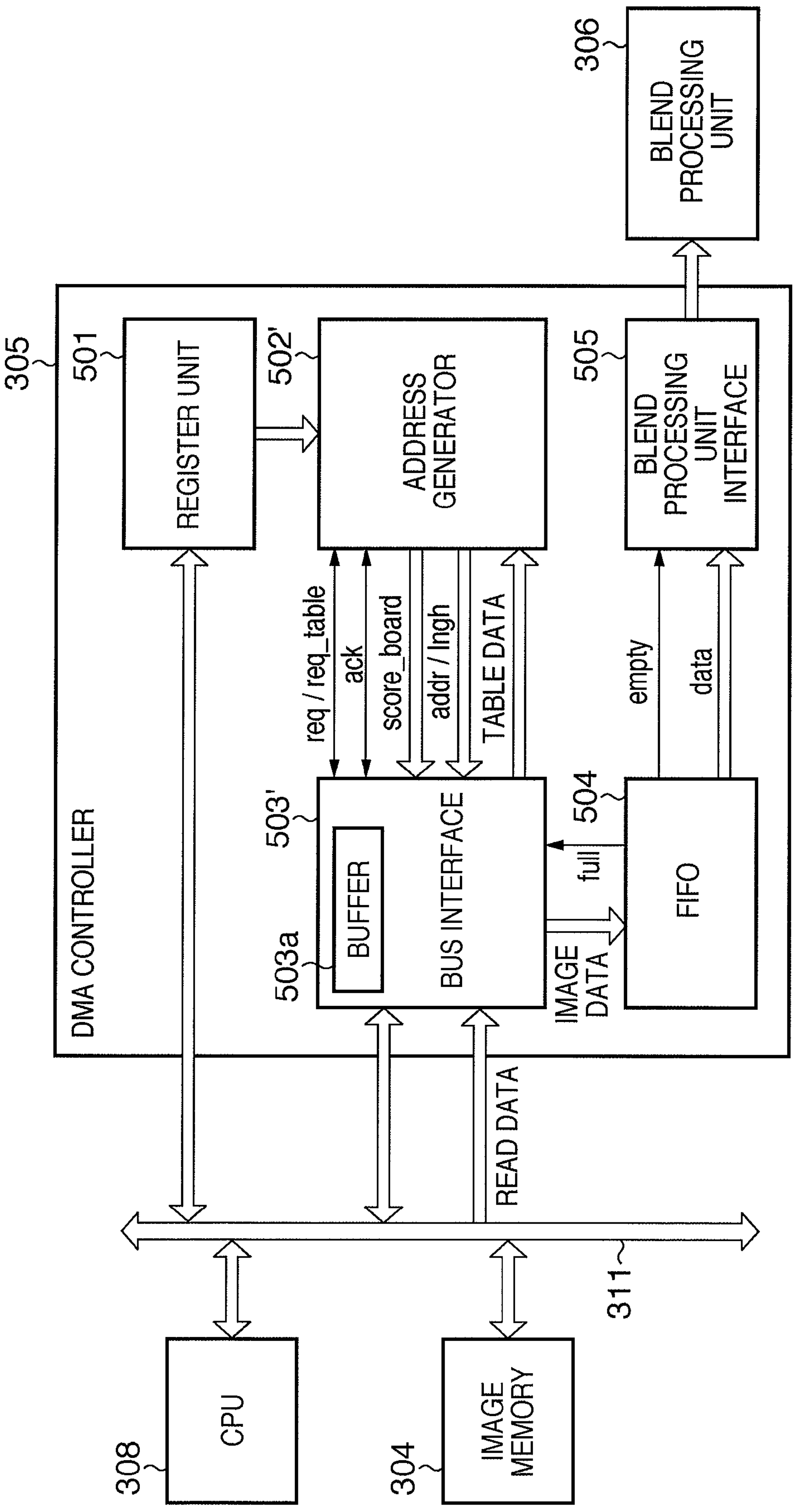
FIG. 11 is a block diagram showing the arrangement of the DMA controller according to the third embodiment of the present invention.

FIG. 11 is a block diagram showing the arrangement of the DMA controller 305 according to the third embodiment of the present invention. The same reference numerals as those in FIG. 3 denote the same parts.

The register unit 501 is formed from a plurality of registers (not shown). The CPU 308 issues an instruction to the DMA controller 305 by writing a proper value in each register of the register unit 501. An address generator 502' refers to the contents of the respective registers of the register unit 501 to generate an address for reading out bitmap image data stored in the image memory 304. The address generator 502' also generates an address for reading the line switching information table in the image memory 304.

By using an address addr and a read data length lngh representing the amount of image data read out from the address, the address generator 502' requests a bus interface 503' to read out image data from the image memory 304. When reading out bitmap image data from the image memory 304, the address generator 502' requests this using a request signal req. When reading out data from the table shown in FIG. 10B, the address generator 502' requests this using a request signal req_table.

Upon receiving the address and data length from the address generator 502', the bus interface 503' issues a read transaction with the image memory 304 to a bus 311. For example, when the data bus width of the bus 311 is 32 bits, the bus interface 503' designates, in accordance with the address and data length, a burst length representing the count at which read of 32 bits is continuously repeated, and issues a read transaction. Upon completion of processing for a pair of an address and data length, the bus interface 503' notifies the address generator 502' by an acknowledgement signal ack of the completion of processing. Upon receiving the acknowledgement signal ack, the address generator 502' can request the next address and data length of the bus interface 503'. The bus interface 503' receives data read out from the image memory 304. If the readout data is bitmap image data, the bus interface 503' writes the readout bitmap image data in a FIFO 504, and if the readout data is table data, sends the readout table data to the address generator 502'.

Data corresponding to the effective segment score_board [i]="1" in the readout bitmap image data is temporarily stored in a data buffer 503*a* in the bus interface 503'. The image data is read out from the data buffer 503*a* and stored in the FIFO 504. Even if a time period during which the blend processing unit 306 cannot receive image data at the moment is generated, the DMA controller 305 can store bitmap image data in the FIFO 504. Immediately when the blend processing unit 306 recovers to be able to receive image data, the FIFO 504 can supply image data to the blend processing unit 306.

The bus interface 503' monitors a FIFO full signal full which is output from the FIFO 504 and represents that the FIFO 504 does not have a space to store data. When the full signal represents that the FIFO 504 is full, the bus interface 503' does not issue a read transaction and waits until the full state is canceled. A blend processing unit interface 505 sends bitmap image data stored in the FIFO 504 to the blend processing unit 306. The blend processing unit interface 505 monitors a FIFO empty signal empty which is output from the FIFO 504 and represents that no data is stored in the FIFO 504. When the FIFO 504 is not empty and the blend processing unit 306 can receive data, the blend processing unit interface 505 reads out bitmap image data from the FIFO 504, and sends it to the blend processing unit 306.

Figure 12A:
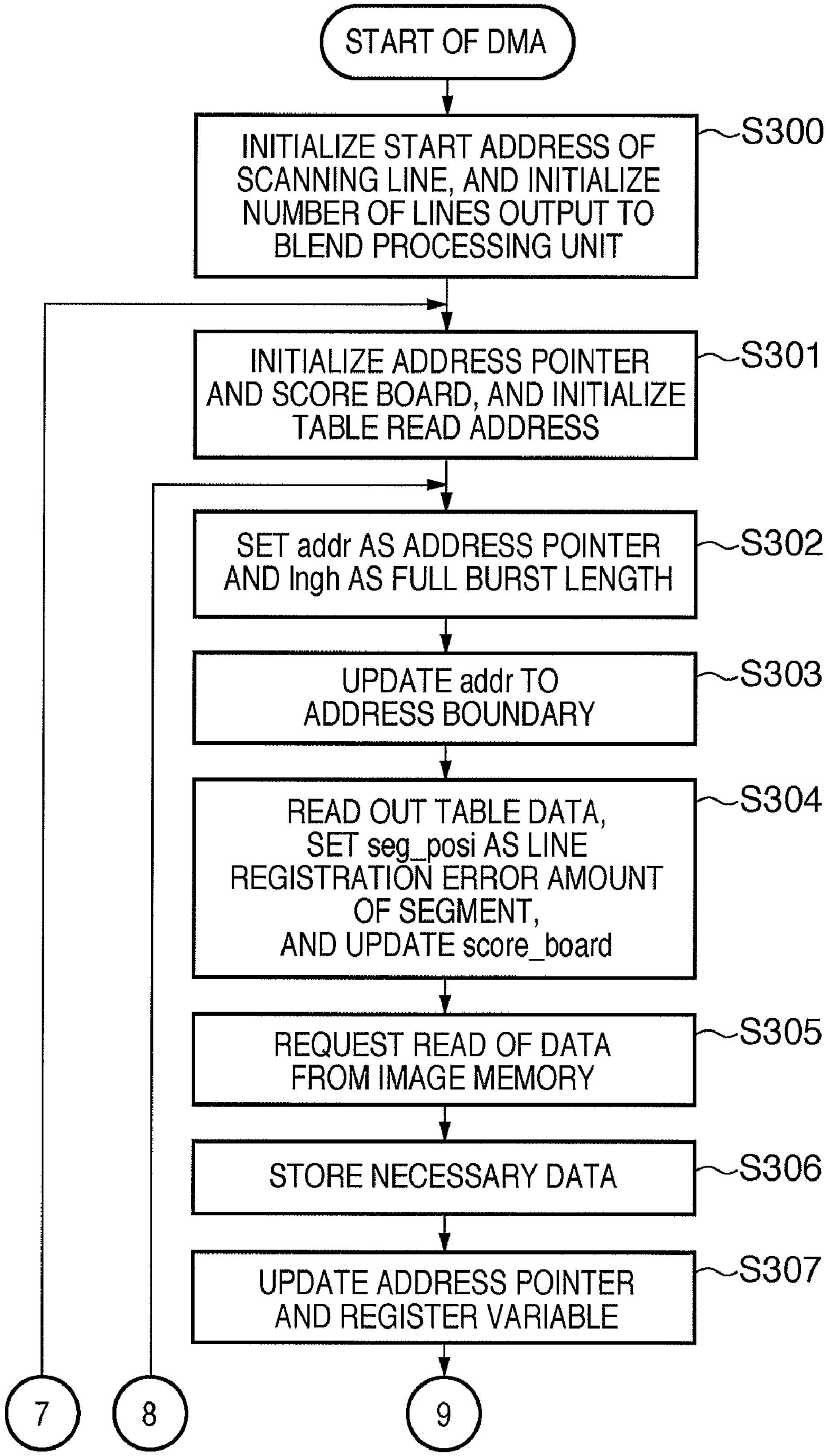
FIGS. 12A and 12B are flowcharts explaining the operation of the address generator of the DMA controller according to the third embodiment of the present invention.
Figure 12B:
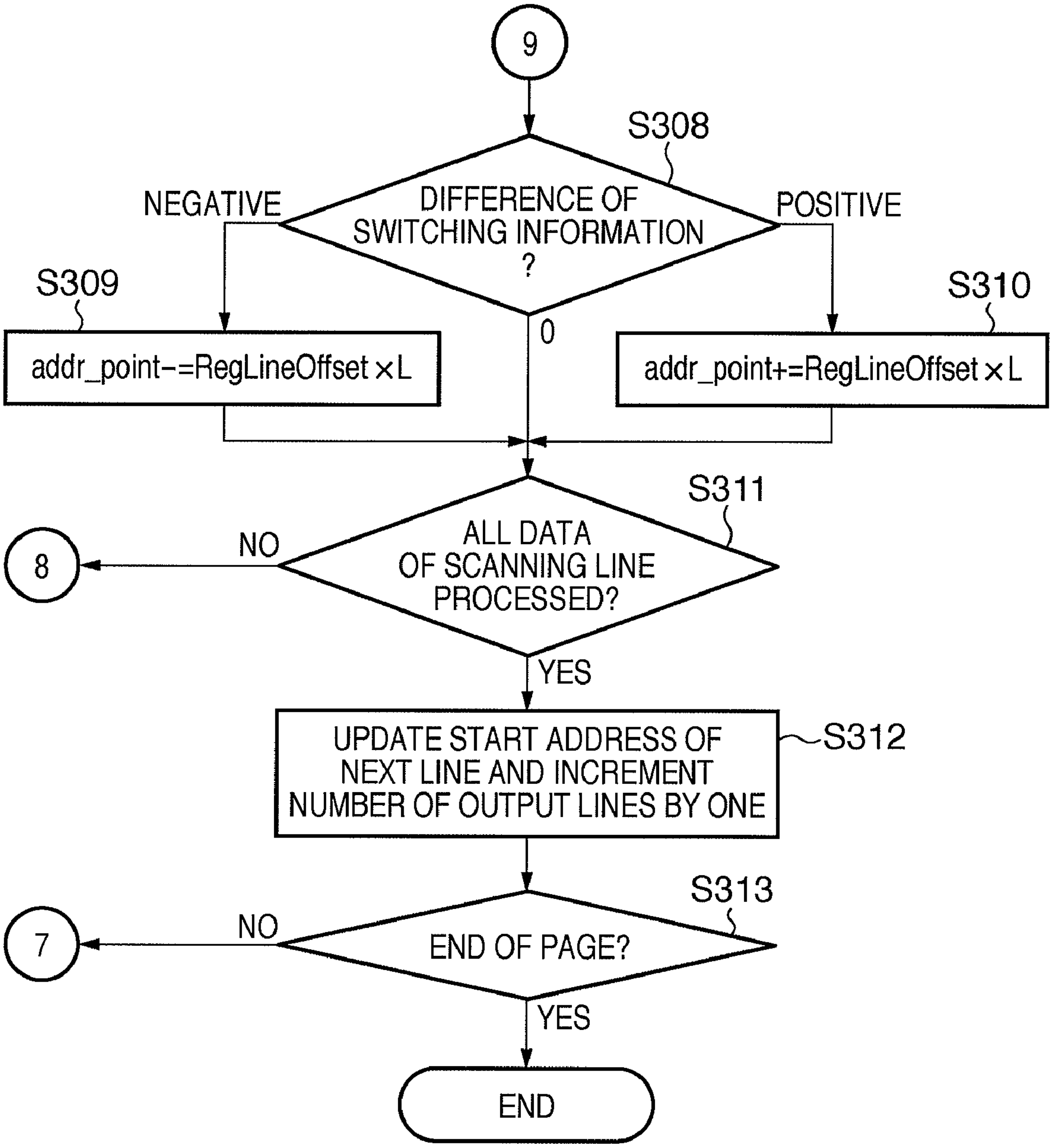

FIGS. 12A and 12B are flowcharts explaining the operation of the address generator 502' of the DMA controller 305 according to the third embodiment of the present invention. The flowcharts in FIGS. 12A and 12B are the same as those in FIGS. 7A and 7B except for processing for storing a registration error amount in the table.

In step S300, when the DMA operation starts in response to an instruction from the CPU 308, the start address line_start_addr of each line is initialized to the value of the start address RegStartAddr of bitmap image data. The number line_cnt of lines sent to the blend processing unit 306 is initialized to "0". In step S301, initialization is performed for each line. A read address pointer addr_point is initialized to the line start address line_start_addr. An effective segment score_board[i] representing effective data on the scanning line that has been transferred to the blend processing unit 306 is initialized. The table address table_addr of the line switching information SegPosi[i] to be referred to is initialized to the value of the start address RegTableStartAddr of the table.

In step S302, initialization is done for each read request. An address addr and read data length lngh which are requested of the bus interface 503' are initialized to the values of the read address pointer addr_point and full burst length, respectively. The full burst length desirably includes a plurality of segment lengths. These signals may be changed in subsequent steps.

In step S303, similar to step S103 in FIG. 7A, the lower bit of the address addr is masked to set an address boundary which enables burst transfer. The process advances to step S304 to request the bus interface 503' to read out table data shown in FIG. 10B at the table address table_addr. At this time, the bus interface 503' is requested of table data of segments falling within the full burst length from the address boundary set at the address addr. The line registration error amount seg_posi of a segment corresponding to the read start address is set as the value of the line switching information SegPosi[i] in the readout table data. Further, it is determined whether data corresponding to a segment having the same line registration error amount SegPosi[i] as the line registration error amount seg_posi exists within the full burst length from the address boundary set at the address addr. Then, "1" is set in the effective segment score_board[i] corresponding to the detected data. The data length lngh is updated to a burst length containing the detected data.

In step S305, bitmap image data is read out from the image memory 304 via the bus interface 503' in accordance with the address addr and data length lngh. In step S306, items of data corresponding to the effective segment score_board[i]="1" in the readout bitmap image data are temporarily stored in the data buffer 503*a* of the bus interface 503'. The items of data stored in the buffer 503*a* are output to the FIFO 504 in the order of scanning lines. The data buffer 503*a* has a capacity enough to store data read out at the full burst length.

The process advances to step S307, and when ack is received from the bus interface 503', the position of data which has not been read out is determined based on the value of the effective segment score_board[i] in order to update the read address pointer addr_point and variable i. Then, a segment corresponding to the next read address is calculated. The variable i is incremented by the calculation result M, and (RegSegLen×M) is set as the value of the address pointer addr_point. In step S308, the next line registration error amount SegPosi[i] is compared with the preceding SegPosi [i-M] to calculate the difference L of switching information. If the difference L of switching information is negative, the process advances to step S309; if it is positive, to step S310. If the difference L of switching information is "0", the process branches to step S311.

In step S309, the line offset (RegLineOffset×L) is subtracted from the address pointer addr_point to switch the current line to a lower one. In step S310, (RegLineOffset×L) is added to the address pointer addr_point to switch the current line to an upper one. The process advances to step S311, and whether all data of the scanning line has been read out is determined by referring to the effective segment score_board [i] representing readout effective data on the scanning line. In this case, if there is data which has not been read out on the scanning line, the process returns to step S302 to repeat the above-described read processing.

Then, the process advances to step S312 to update each data in order to process the next line. In this case, the offset value RegLineOffset is added to the start address line_start_addr of each line to set the start address to that of the next line. Also, the number line_cnt of lines sent to the blend processing unit 306 is incremented by one. In step S313, the number line_cnt of lines sent to the blend processing unit 306 is compared with the number RegBeams of lines to be sent to the blend processing unit 306 to determine whether data of one page has been processed. If the number line_cnt of lines is smaller than the value of RegBeams, a line to be processed still remains. Thus, the process returns to step S301 to repeat the above-described processing for the next line. If the number line_cnt of lines is equal to or larger than the value of RegBeams, the DMA operation ends. At the end of the DMA operation, the DMA controller 305 sends an interrupt signal to the CPU 308. The CPU 308 detects the interrupt signal to detect that the DMA operation has ended. The processes in steps S307 to S313 are the same as those in steps S106 to S112 in FIGS. 7A and 7B.

As described above, according to the third embodiment, in addition to the effects of the first embodiment, it can be designated whether to shift up or down or not to shift the line for each segment in accordance with the curvature of a scanning line, while keeping the lengths of segments constant. Even while keeping the lengths of segments constant, the third embodiment can prevent color misregistration caused by a registration error owing to the curvature of a scanning line.

Fourth Embodiment

The operation of a DMA controller 305 according to the fourth embodiment of the present invention will be explained with reference to FIGS. 13A, 13B, and 14. The hardware configuration of an image forming apparatus according to the fourth embodiment is the same as that in the third embodiment, and a description thereof will not be repeated.

Figure 13A:
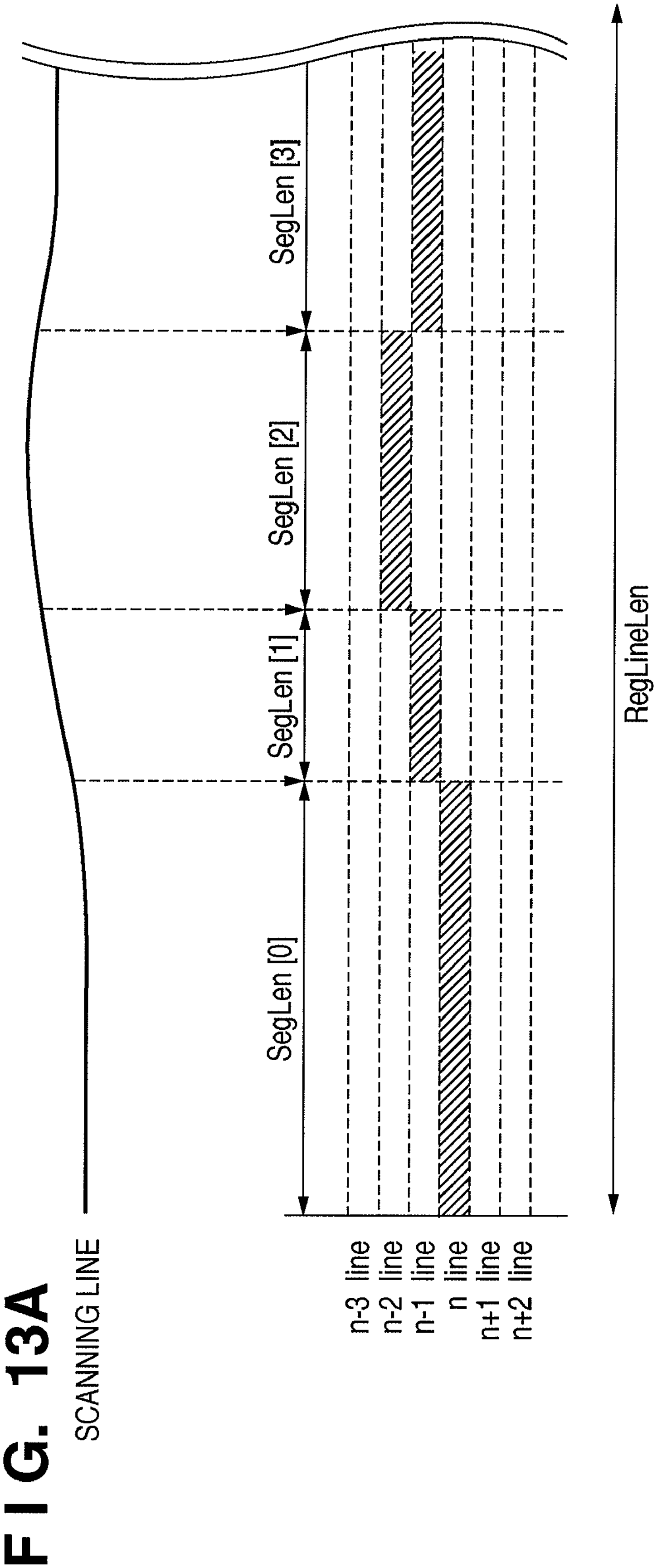
FIGS. 13A and 13B depict views illustrating an example of a method of instructing a DMA controller on the curvature of a scanning line according to the fourth embodiment of the present invention.
Figure 13B:
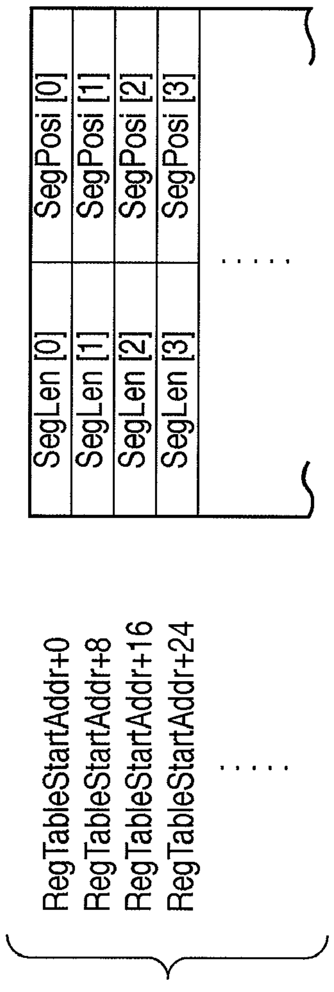

FIGS. 13A and 13B depicts views explaining a method of instructing the DMA controller 305 on the curvature of a scanning line according to the fourth embodiment of the present invention. Assume that the segment length on one line is variable, and the registration error amount of each segment from a reference line can be set.

Unlike the second and third embodiments described above, a length (segment length) SegLen[i] up to a line switching position, and a registration error amount SegPosi[i] from a reference line is changed in accordance with the curvature of a scanning line. FIG. 13B shows the structure of table data which stores the segment length SegLen[i] and the registration error amount SegPosi[i] representing the number of lines which corresponds to the registration error amount of each segment from a reference line. This table is stored in an image memory 304 or RAM 310. In read from the table, a read start address RegTableStartAddr is set in a register unit 501 of the DMA controller 305. Also in the fourth embodiment, the start address RegStartAddr of bitmap image data and the line length RegLineLen of bitmap image data are set. Also, an address offset value RegLineOffset between adjacent lines of bitmap image data, and the number RegBeams of lines to be sent to a blend processing unit 306 are set in the register unit 501 of the DMA controller 305. The register unit 501 of the DMA controller 305 further includes an activation register (not shown) for starting the DMA operation upon completion of setting the register values by a CPU 308.

Figure 14A:
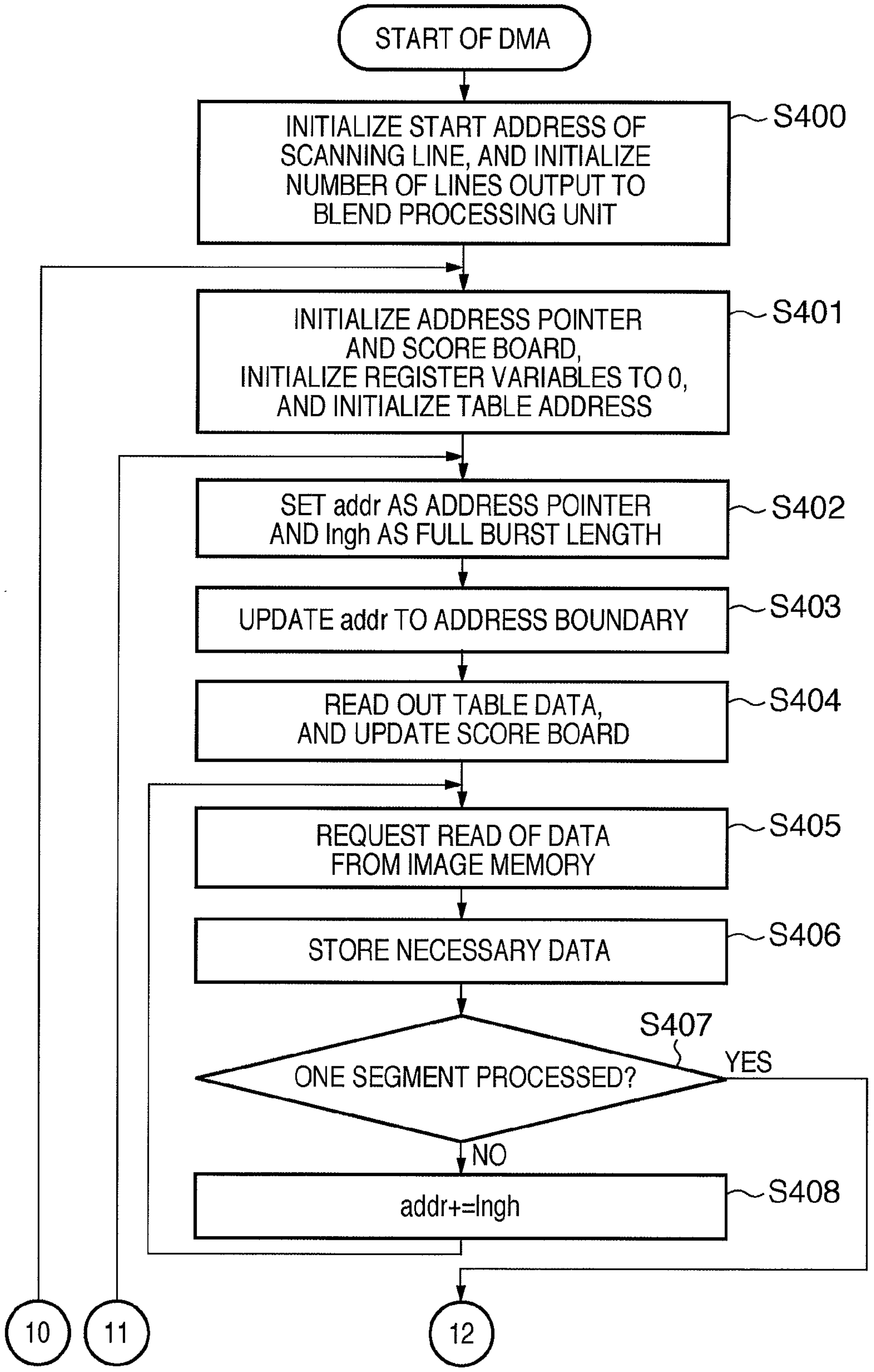
FIGS. 14A and 14B are flowcharts explaining the operation of the address generator of the DMA controller according to the fourth embodiment of the present invention.
Figure 14B:
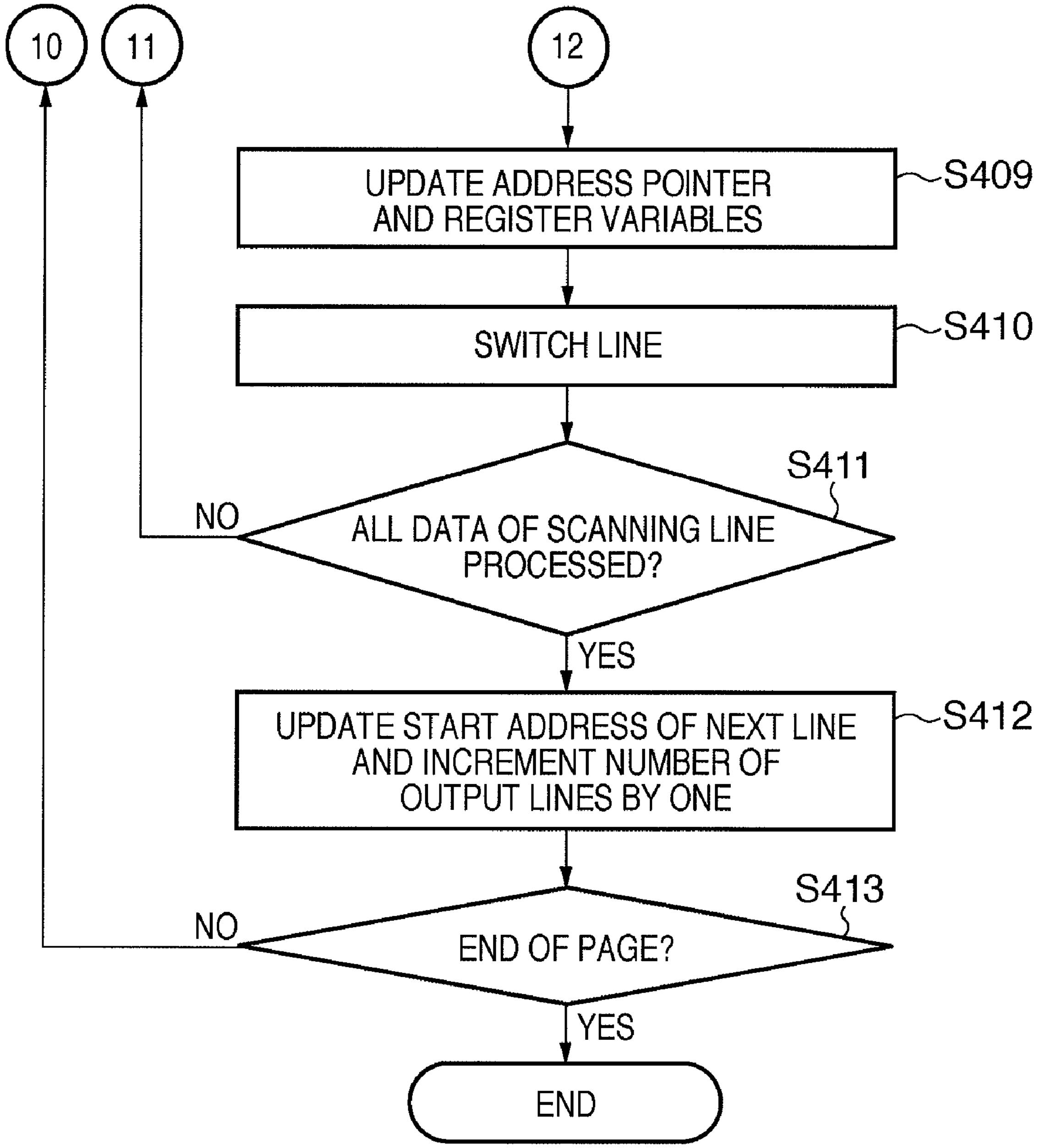

FIGS. 14A and 14B are flowcharts explaining the operation of an address generator 502' of the DMA controller 305 according to the fourth embodiment of the present invention. The flowcharts in FIGS. 14A and 14B are the same as those in FIGS. 9A and 9B except for processing for storing a registration error amount in the table.

In step S400, when the DMA operation starts in response to an instruction from the CPU 308, the start address line_start_addr of each line is initialized to the start address RegStartAddr of bitmap image data. The number line_cnt of lines sent to the blend processing unit 306 is initialized to "0". In step S401, initialization is performed for each line. A read address pointer addr_point is initialized to the line start address line_start_addr. An effective segment score_board[i] representing effective data on the scanning line that has been transferred to the blend processing unit 306 is initialized. The length SegLen[i] of a segment to be referred to, and the table address table_addr of the line switching information SegPosi[i] are initialized to the value of the start address RegTableStartAddr of the table. The variable i is initialized to "0".

In step S402, initialization is done for each read request. An address addr requested of a bus interface 503' is initialized to the read address pointer addr_point. The read data length lngh is initialized to the full burst length. These signals are changed in subsequent steps.

The process advances to step S403 to mask the lower bit of the address addr and set an address boundary which enables burst transfer, similar to step S203. In step S404, a data read request is issued to the bus interface 503' in order to read out table data from the table address table_addr. Based on the data read out from the table, seg_posi is set as the line switching information SegPosi[i] of a segment corresponding to the address pointer addr_point. Further, "1" is set in the effective segment score_board corresponding to seg_posi.

In step S405, a read request is issued to the bus interface 503' on the basis of the address addr and read data length (burst length) lngh. In response to this, bitmap image data of the designated data length lngh is read out from the address addr in the image memory 304. In step S406, items of data corresponding to the effective segment score_board[i]="1" in the readout bitmap image data are temporarily stored in a data buffer 503*a* of the bus interface 503'. The items of data stored in the data buffer 503*a* are output to a FIFO 504 in the order of scanning lines. The data buffer 503*a* has a capacity enough to store data read out at the full burst length.

In step S407, it is determined by referring to the address addr and data length lngh whether one segment has been processed in response to the read request. If the read of the segment has not been completed and ack is received from the bus interface 503', the data length lngh is added to the address addr to update the address addr in step S408. In this way, bitmap image data, read of which has not been completed, can be read out. Upon completion of reading out each segment, the process advances to step S409.

In step S409, ack is received from the bus interface 503', the position of data which has not been read out is determined based on the value of the effective segment score_board[i] in order to update the read address pointer addr_point and variable i. Then, a value up to this position is set in the next read address pointer addr_point. The process advances to step S410 to add {(the difference between SegPosi[i] and SegPosi [i+1])×RegLineOffset} to the address pointer addr_point. The variable i is incremented by one to switch the read line to the next one.

Then, the process advances to step S411, and whether all data of the scanning line have been read out is determined by referring to the effective segment score_board[i] representing readout effective data on the scanning line. If read of the scanning line has not been completed, the process returns to step S402 to repeat the above-described read processing. In step S412, each data is updated to process the next line data. In this case, the address offset value RegLineOffset between adjacent lines of bitmap image data is added to the start address line_start_addr of each line to set the start address of the next line. Also, the number line_cnt of lines output to the blend processing unit 306 is incremented by one. In step S413, the number line_cnt of output lines is compared with the number RegBeams of lines to be sent to the blend processing unit 306. If the number line_cnt of output lines is smaller than the total number RegBeams of lines to be sent, line data to be processed still remains. Thus, the process returns to step S401 to repeat the above-described line processing. If the number line_cnt of output lines is equal to or larger than the total number RegBeams of lines to be sent, data of one page has been processed, and the DMA operation ends. At the end of the DMA operation, the DMA controller 305 notifies the CPU 308 by an interrupt signal (not shown) that the DMA operation has ended. The CPU 308 detects the interrupt to detect that the DMA transfer has ended.

As described above, according to the fourth embodiment, in addition to the effects of the first embodiment, it can be designated whether to shift up or down or not to shift the line for each segment in accordance with the curvature of a scanning line, while changing the lengths of segments. The fourth embodiment can, therefore, prevent color misregistration caused by a registration error owing to the curvature of a scanning line.

Fifth Embodiment

The operation of a DMA controller 305 according to the present invention will be explained with reference to FIGS. 15, 16, and 17. The hardware configuration of an image forming apparatus according to the fifth embodiment is the same as that in the third embodiment, and a description thereof will not be repeated.

Figure 15:
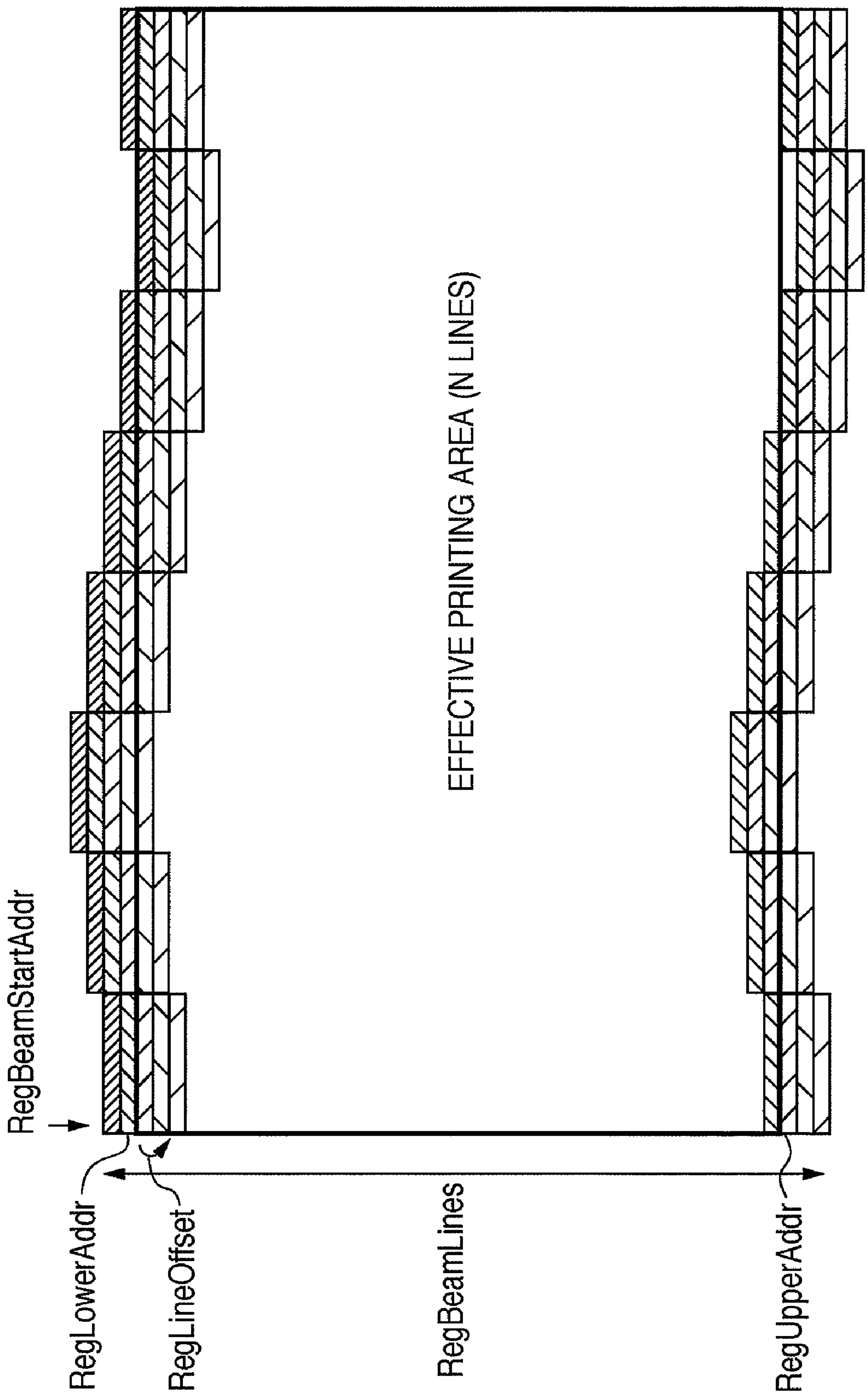
FIG. 15 depicts a view illustrating an example of a method of instructing a DMA controller on the memory address of an effective image area according to the fifth embodiment of the present invention.

FIG. 15 depicts a view explaining a method of instructing the DMA controller 305 on an effective image area by the memory address according to the fifth embodiment of the present invention.

The read start position RegBeamStartAddr of data corresponding to a given scanning line, and the start address RegLowerAddr of the effective image area are set in a register unit 501 of the DMA controller 305. Further, an address RegUpperAddr subsequent to the end of the effective image area, and the total number RegBeamLines of read scanning lines within one page are set. In addition, an address offset value RegLineOffset between lines, and data RegFillData outside the effective printing area can be set.

Figure 16A:
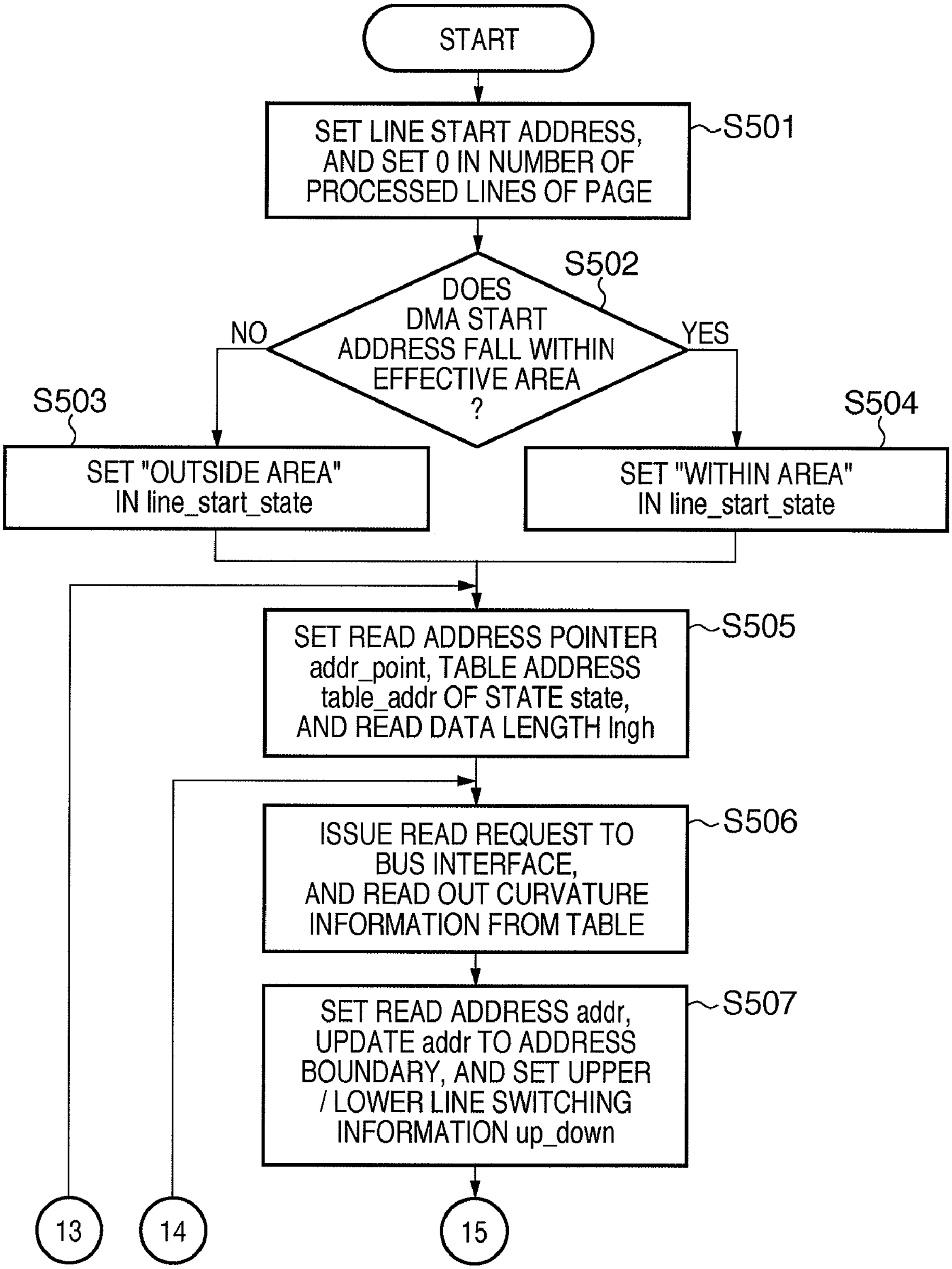
FIGS. 16A and 16B are flowcharts explaining the operation of the address generator of the DMA controller according to the fifth embodiment of the present invention.
Figure 16B:
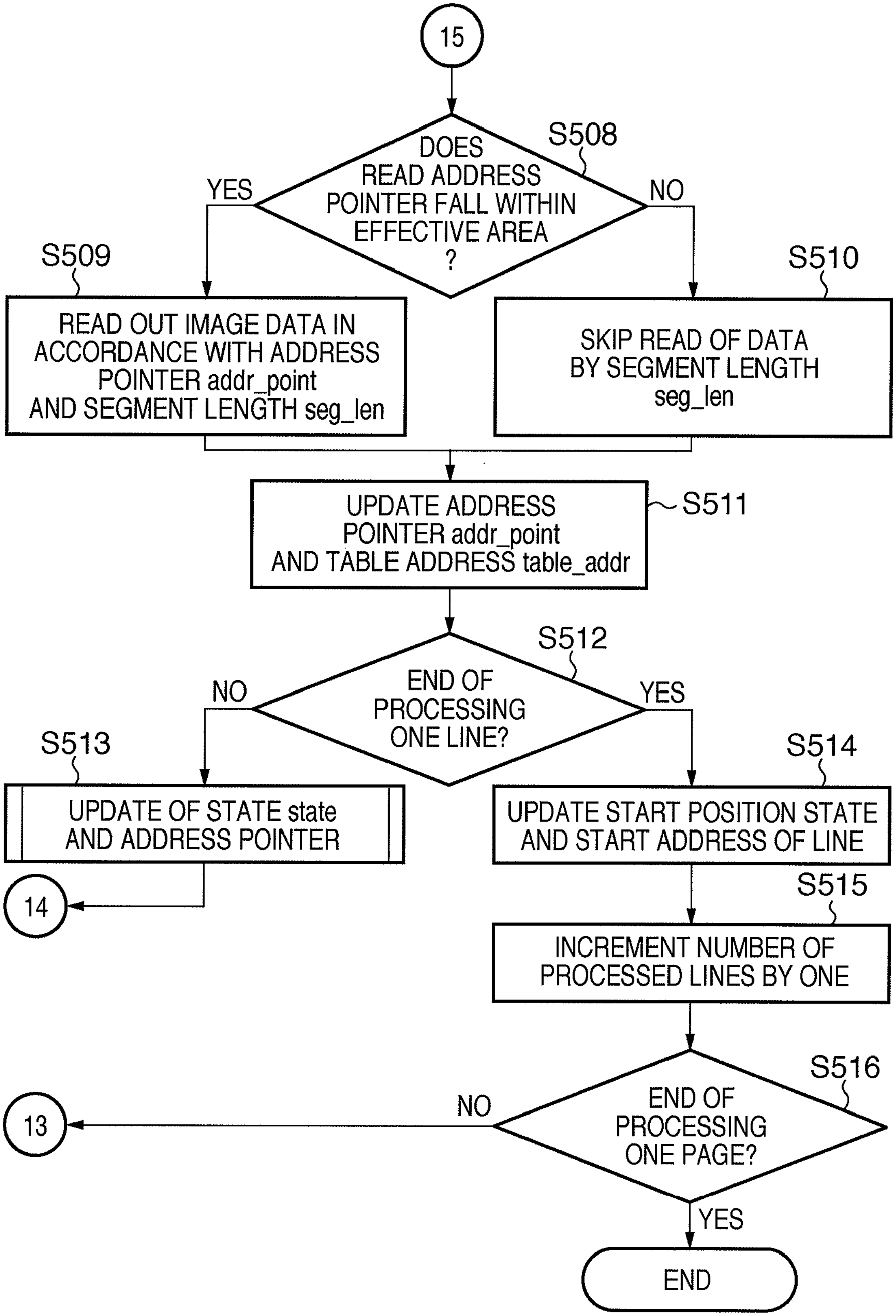

FIGS. 16A and 16B are flowcharts explaining the operation of an address generator 502' of the DMA controller 305 according to the fifth embodiment of the present invention.

In step S501, initialization is done for DMA processing of one page. The read start position RegBeamStartAddr of data corresponding to a scanning line is set as a line start address line_start_addr, and "0" is set in the number lines_cnt of processed lines in the page. In step S502, it is determined whether the DMA start address falls within the effective area of the image. If the DMA start address falls outside the effective area, the process advances to step S503 to set, in a line start position state line_start_state, a value representing that the DMA start address falls outside the effective area. If it is determined in step S502 that the DMA start address falls within the effective area, the process advances to step S504 to set, in line_start_state, a value representing that the DMA start address falls within the effective area.

The process advances to step S505 to perform initialization for each line. In this case, processes in step S505 and subsequent steps are repeated by the number of lines of the page. The line start address line_start_addr is set in a read address pointer addr_point, and the full burst length is set in the read data length lngh. The line start position state line_start_state is set in a state state, and the start address RegTableStartAddr of the table is set in a table address table_addr.

The process advances to step S506 to read out curvature information from the table via a bus interface 503' on the basis of the table address. The process advances to step S507 to set, based on the readout table data, a segment length seg_len and information UpDown[i] representing whether to move the line to an upper or lower one at a boundary.

The process advances to step S508 to determine, based on the state state, whether the read address pointer addr_point falls within the effective area. If the read address pointer addr_point falls within the effective area, the process advances to step S509 to issue a read request to the bus interface 503'. If the read address pointer addr_point falls outside the effective area, the process advances to step S510 to transfer data RegFillData outside the effective printing area by the segment length seg_len to a subsequent image processing block. In step S509, if the segment length seg_len is larger than the read data length lngh, a read request is issued a plurality of number of times, completing the read of each segment length, similar to S204, S205, S206, and S207 described in the third embodiment. After executing step S509 or S510 in this manner, the process advances to step S511 to update the address pointer addr_point. The segment length seg_len is added to the address pointer addr_point, and the table address table_addr is incremented by eight. The process advances to step S512 to determine whether one line has been processed. At this time, if no curvature determination of one line has ended, the process advances to step S513 to update the state state, address pointer addr_point, and upper/lower line switching information UpDown. Then, the process returns to step S506. If it is determined in step S512 that processing of one line has ended, the process advances to step S514.

Figure 17:
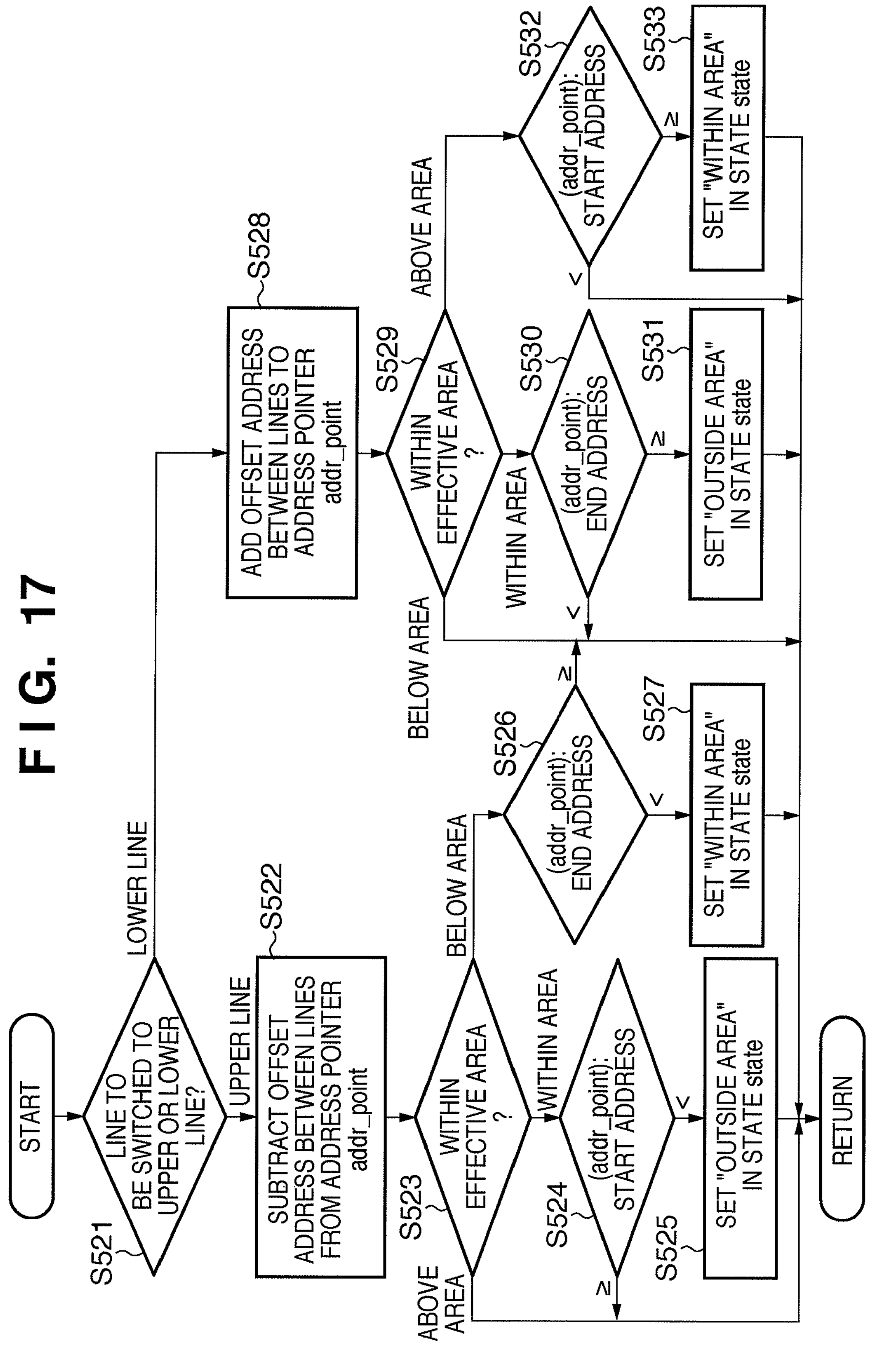
FIG. 17 is a flowchart explaining details of a process in step S513 of FIG. 16B to update a state and address.

FIG. 17 is a flowchart explaining details of the process in step S513 of FIG. 16B to update the state state and address.

In step S521, the upper/lower line switching information UpDown is checked. If the curvature information represents an upper line, the process advances to step S522 to subtract the address offset value RegLineOffset between lines from the address pointer addr_point. If the curvature information represents a lower line, the process advances to step S528 to add the offset value RegLineOffset to the address pointer addr_point.

If the curvature information represents an upper line, the process advances from step S522 to step S523 to determine which of "within the effective area", "above the effective area", and "below the effective area" is represented by the state state. If the state state represents that the upper line exists above the effective area, lines above this line fall outside the effective area and remain above the effective area, and thus the process ends. If the state state represents the upper line falls within the effective area, the process advances to step S524 to compare the value of the address pointer addr_point of the updated upper line with the start address RegLowerAddr of the effective image area. If the start address RegLowerAddr of the effective image area is larger than the value of the address pointer addr_point, the updated upper line address falls within the effective area. Thus, the process advances to step S525 to set, in the state state, a value representing that the upper line falls outside the effective area. If the start address RegLowerAddr is equal to or smaller than the value of the address pointer addr_point in step S524, the updated upper line address falls within the effective area, and the process ends without changing the state state.

If it is determined in step S523 that the state state represents that the upper line exists below the effective area, the process advances to step S526 to compare the value of the address pointer addr_point with the address RegUpperAddr subsequent to the end of the effective image area. If the subsequent address RegUpperAddr is larger than the value of the address pointer addr_point, the lower line falls within the effective area. Thus, the process advances to step S527 to set, in the state state, a value representing that the lower line falls within the effective area. If the subsequent address RegUpperAddr is smaller than the value of the address pointer addr_point, the lower line remains below the effective area, and the process ends without changing the state state.

If the curvature information represents a lower line, the process advances from step S528 to step S529 to determine which of "within the effective area", "above the effective area", and "below the effective area" is represented by the state state. If the state state represents that the lower line exists below the effective area, lines below the lower line unconditionally fall outside the effective area, and the process ends without changing the state state. If the state state represents that the lower line exists above the effective area, the process advances from step S529 to step S532 to compare the value of the updated address pointer addr_point with the start address RegLowerAddr of the effective image area. If the start address RegLowerAddr is larger than the value of the address pointer addr_point, the lower line falls outside the effective area, and the process ends without changing the state state. If it is determined in step S532 that RegLowerAddr is smaller than the value of the address pointer addr_point, the process advances to step S533 to change the state state to a value representing that the lower line falls within the effective area. If it is determined in step S529 that the state state represents that the lower line falls within the area, the process advances to step S530 to compare the value of the address pointer addr_point with the subsequent address RegUpperAddr. If the subsequent address RegUpperAddr is larger than the value of the address pointer addr_point, the process ends without changing the state state. If the subsequent address RegUpperAddr is smaller than the value of the address pointer addr_point, the process advances to step S531 to set, in the state state, a value representing the lower line exists below the effective area. After updating the state state, the process returns to step S506 in FIG. 16A.

Referring back to FIG. 16B, in step S514, the line start position state line_start_state and line start address line_start_addr are updated as a process to shift to the next line processing. Then, the process advances to step S515 to increment the number lines_cnt of processed lines in the page by one. In step S516, it is determined whether one page has been processed. If one page has been completely processed, the process ends; if it has not been completely processed, returns to step S505 to execute the above-described processing.

As described above, according to the fifth embodiment, in addition to the effects of the first embodiment, the DMA controller can read out a curved image data to cancel the curvature of a scanning line, and can generate predetermined data outside the effective area. For example, even a compact printer in which the printer engine does not have the mask function and the scanning line curves can obtain a high-quality output.

Sixth Embodiment

The operation of a DMA controller 305 according to the sixth embodiment of the present invention will be explained with reference to FIGS. 18 and 19. The hardware configuration of an image forming apparatus according to the sixth embodiment is the same as that in the third embodiment, and a description thereof will not be repeated.

Figure 18:
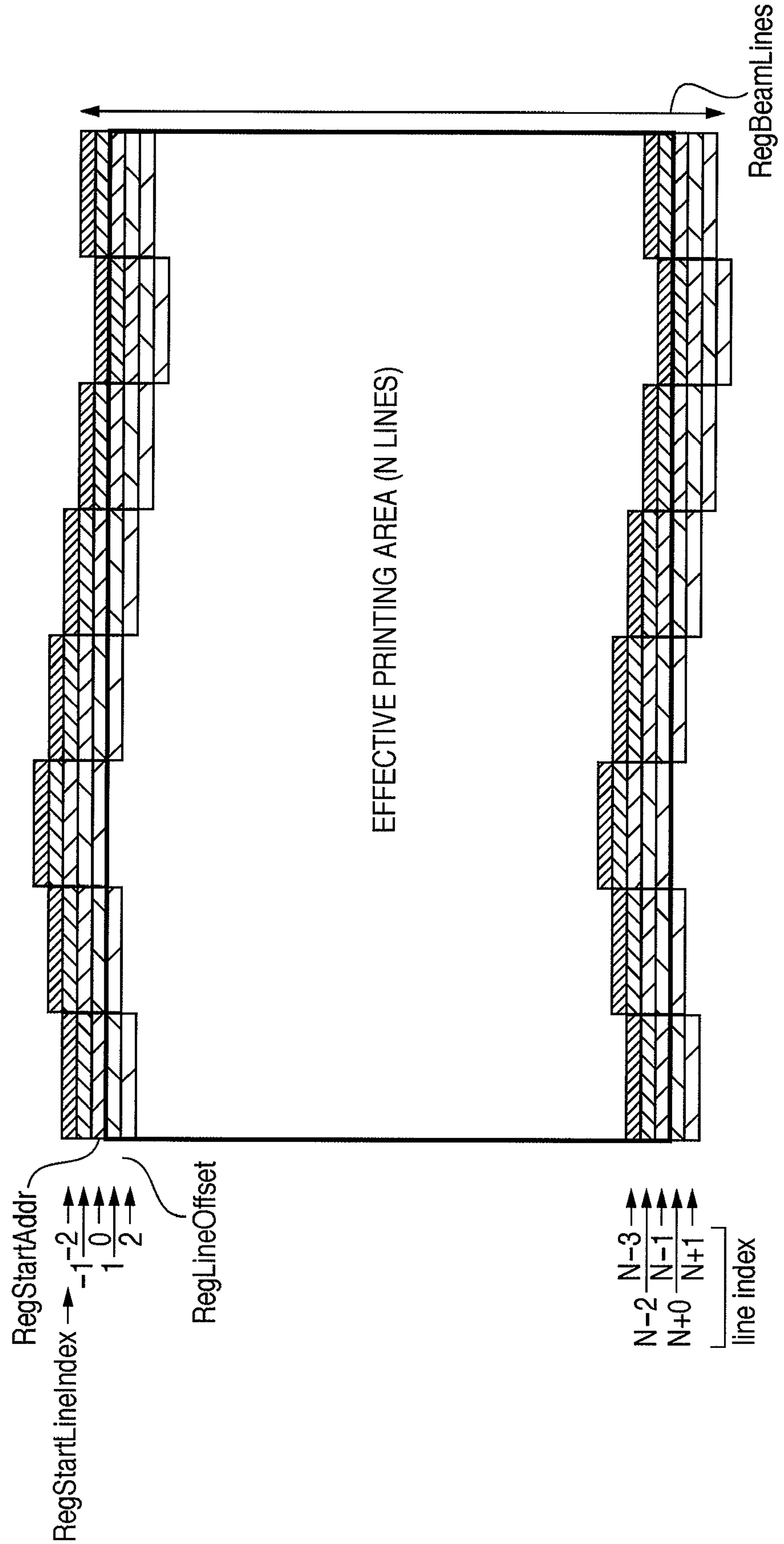
FIG. 18 depicts a view illustrating an example of a method of instructing a DMA controller on an effective image area by an address in the memory according to the sixth embodiment of the present invention.

FIG. 18 depicts a view explaining a method of instructing the DMA controller 305 on an effective image area by an address in the memory according to the sixth embodiment of the present invention.

RegTableStartAddr represents the start address of a table which stores curvature information, and RegStartAddr represents the start address of a memory which stores image data. RegStartLineIndex represents an index indicating the start position of a beam (the sixth embodiment will exemplify a curvature of two, upper and lower lines, and the index is set to "−2". "0" corresponds to the start line of the effective area). The number RegBeamLines of scanning lines of one page, an address offset value RegLineOffset between lines, and data RegFillData outside the effective area can be set.

Figure 19A:
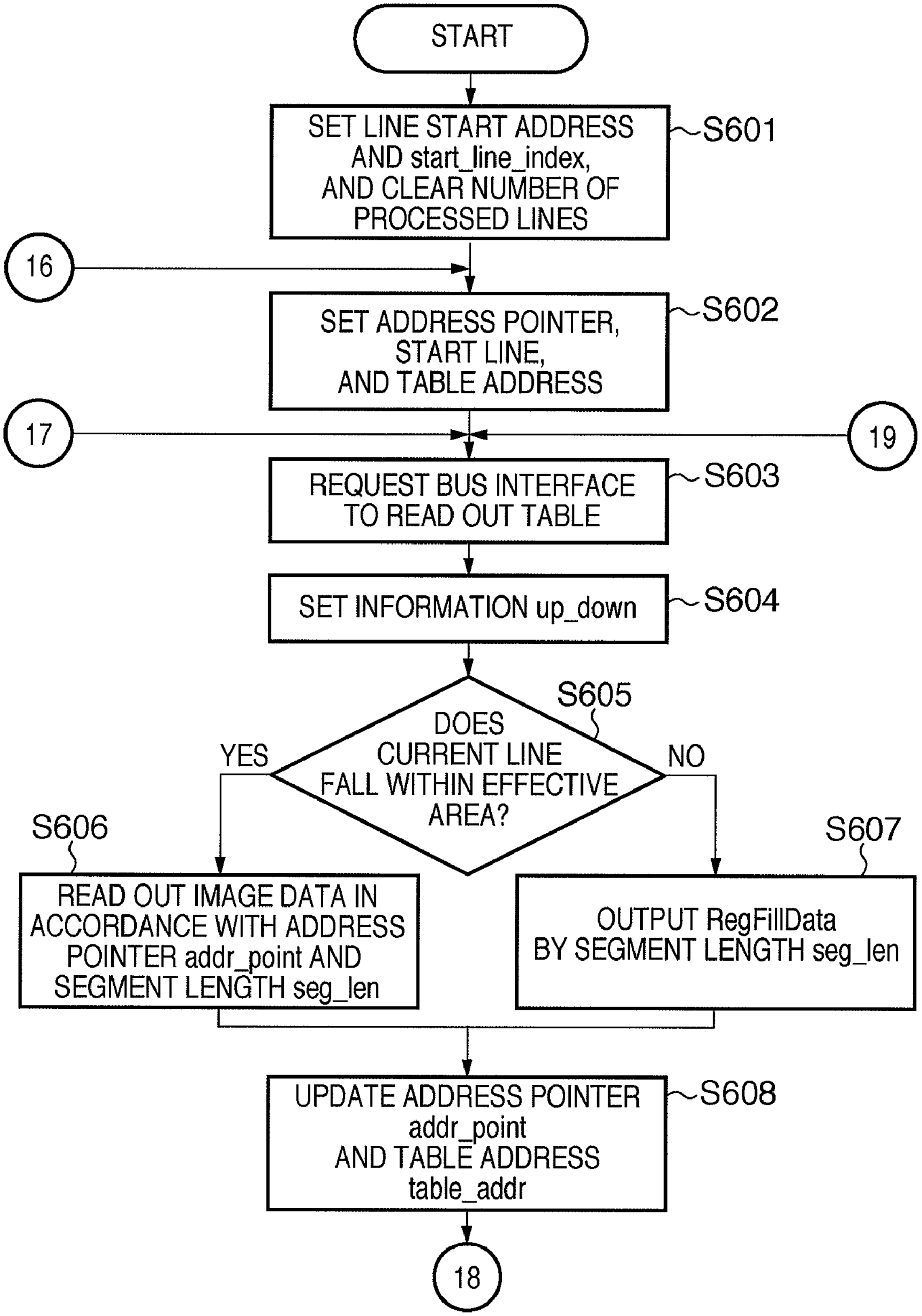
FIGS. 19A and 19B are flowcharts explaining the operation of the address generator of the DMA controller according to the sixth embodiment of the present invention.
Figure 19B:
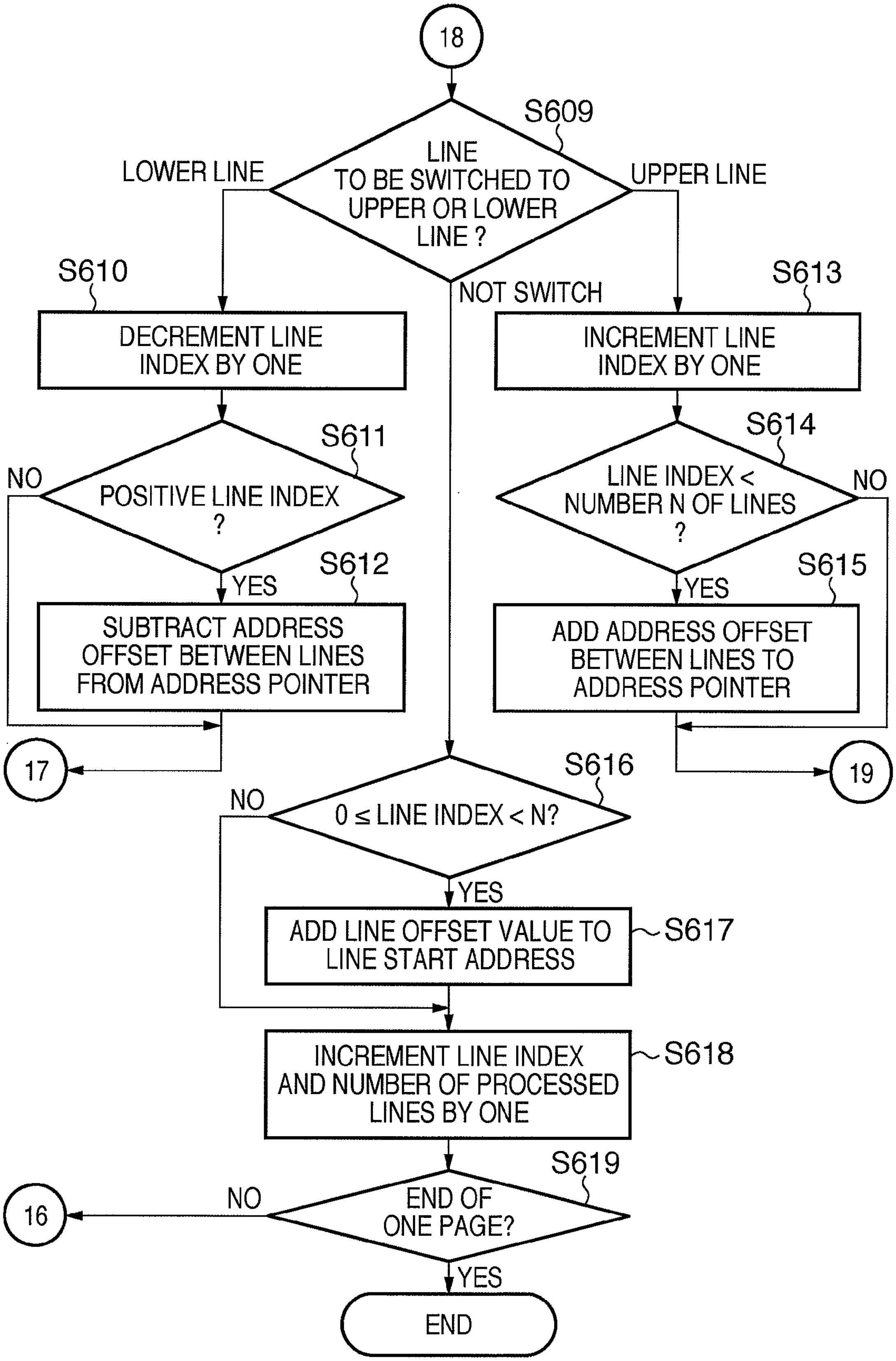

FIGS. 19A and 19B are flowcharts explaining the operation of an address generator 502' of the DMA controller 305 according to the sixth embodiment of the present invention.

In step S601, initialization is done for this processing. In this case, the start address RegStartAddr of the memory which stores image data is set in a line start address line_start_addr. The index RegStartLineIndex representing the start position of one page is set in a start line index start_line_index, and "0" is substituted into the number lines_cnt of processed lines in the page. The process advances to step S602 to initialize each line processing. In this case, the line start address line_start_addr is set in the address addr, and the start line index start_line_index is set in a line index line_index. The start address RegTableStartAddr of the table which stores curvature information is substituted into a table address table_addr.

The process advances to step S603 to request a bus interface 503' to read out the table. The process advances to step S604 to set a segment length seg_len and upper/lower line switching information up_down_info on the basis of the table data read out in step S603. The process advances to step S605 to check the line index line_index. If the line index of the current line is equal to or larger than the 0 and equal to or smaller than N (the number of lines in the effective printing area), the current line falls within the effective printing area. The process advances to step S606 to request the bus interface 503' to read out image data, similar to step S509 in FIG. 16B. If it is determined in step S605 that the current line falls outside the effective printing area, the process advances to step S607 to transfer RegFillData of the segment length seg_len to a subsequent image processing block. Since the specific data RegFillData is output outside the effective printing area, mask processing and the like in subsequent steps can be omitted.

After executing step S606 or S607 in this manner, the process advances to step S608 to add the segment length seg_len to the address pointer addr_point, and increment the table address table_addr by eight. In step S609, the upper/lower line switching information up_down_info is checked. If it is determined in step S609 to switch the line to a lower one, the process advances to step S610 to decrement the line index line_index by one. If it is determined in step S611 that the decremented line index is equal to or larger than "0", the process advances to step S612. The offset address value RegLineOffset between lines is subtracted from the address addr, and then the process advances to step S603. If it is determined in step S611 that the decremented line index line_index is smaller than "0", the process returns to step S603.

If it is determined in step S609 to switch the line to an upper one, the process advances to step S613 to increment the line index line_index by one. The process advances to step S614, and if the incremented line index is smaller than the number N of lines in the effective printing area, the current line falls within the effective area, and the process advances to step S615. The address offset value RegLineOffset between lines is added to the address pointer addr_point, and then the process returns to step S603. If it is determined in step S614 that the incremented line index is larger than N, the current line falls outside the effective area, and the process returns to step S603. If it is determined in step S609 to switch the line neither to an upper nor lower one, the process advances to step S616 to determine whether the current line index start_line_index falls within the effective area, i.e., is equal to or larger than "0" and equal to or smaller than the total number N of lines. If the current line index start_line_index falls within the effective area, the process advances to step S617 to add the offset address value RegLineOffset between lines to the line start address line_start_addr, and then advances to step S618. If it is determined in step S616 that the current line index start_line_index falls outside the effective area, the process advances to step S618 to increment the current start line index start_line_index and the number lines_cnt of processed lines by one. The process advances to step S619, and whether one page has been processed is determined by determining whether the number lines_cnt of processed lines is larger than the number RegBeamLines of lines of one page. If it is determined that processing of one page has not ended, the process advances to step S602. If it is determined that one page has been processed, the process ends.

As described above, according to the sixth embodiment, in addition to the effects of the first embodiment, the DMA controller can read out a curved image data to cancel the curvature of a scanning line, and can generate predetermined data outside the effective area. For example, even a compact printer in which the printer engine does not have the mask function and the scanning line curves can obtain a high-quality output.

Seventh Embodiment

The operation of a DMA controller 305*a* according to the seventh embodiment of the present invention will be explained with reference to FIGS. 20, 21, 22A, 22B, 23A to 23C, 24, and 25.

Figure 20:
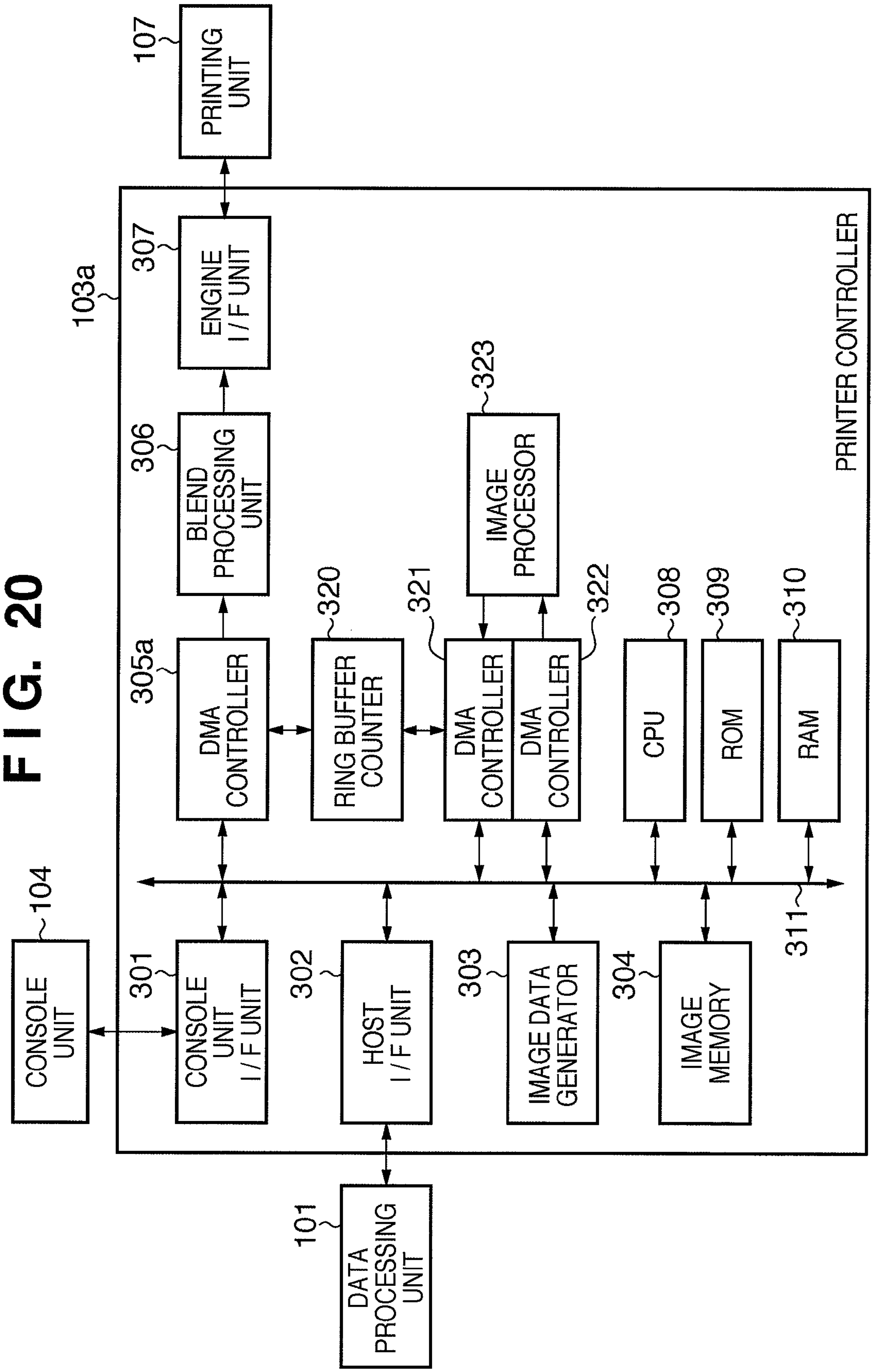
FIG. 20 is a block diagram showing the detailed arrangement of a printer controller according to the seventh embodiment of the present invention.

FIG. 20 is a block diagram showing the detailed arrangement of a printer controller 103*a* according to the seventh embodiment of the present invention. The same reference numerals as those in the block diagram of FIG. 2 denote the same parts, and a description thereof will not be repeated.

Figure 21:
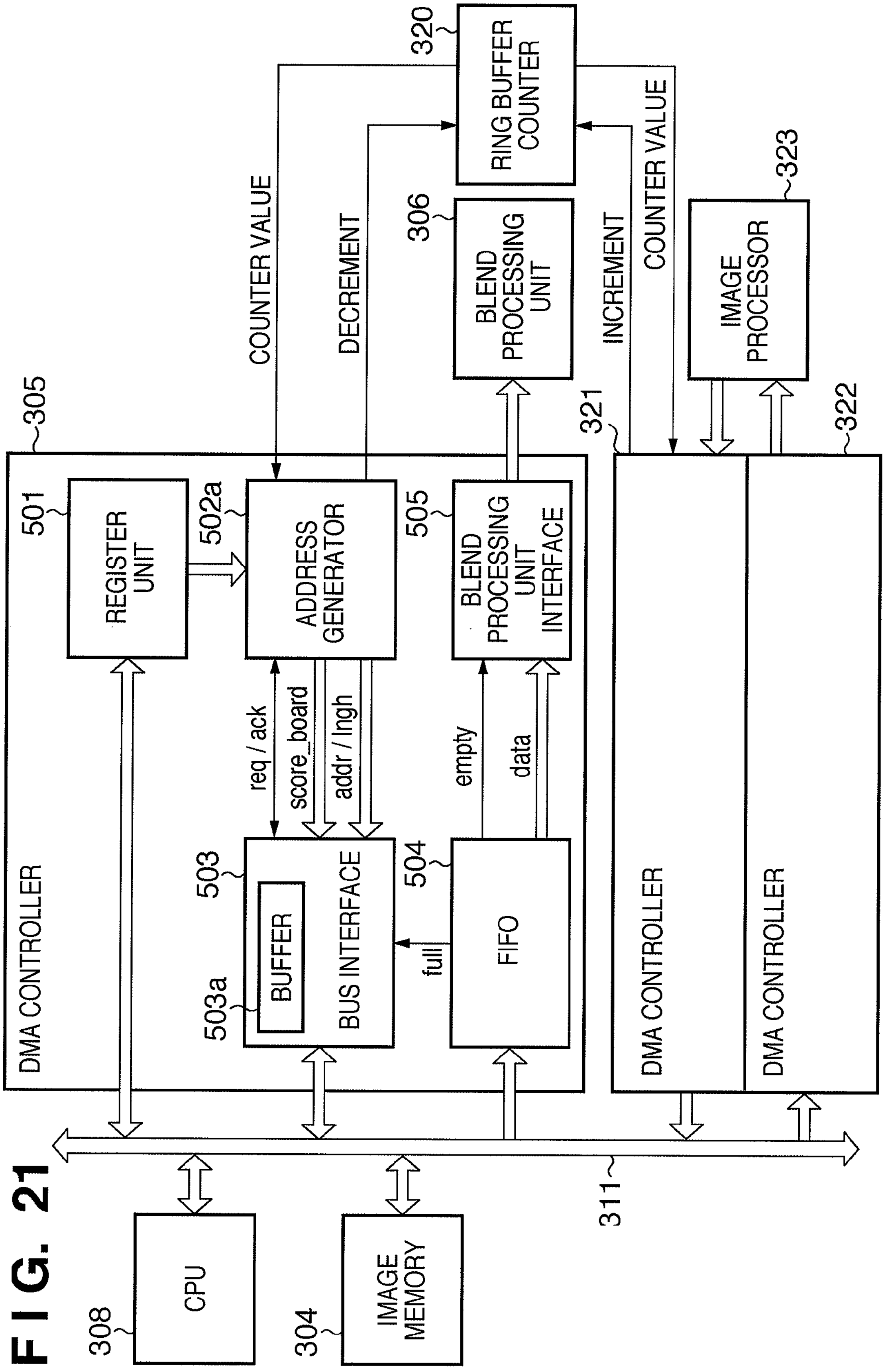
FIG. 21 is a block diagram showing the detailed arrangement of a DMA controller of the printer controller according to the seventh embodiment of the present invention.

FIG. 21 is a block diagram showing the detailed arrangement of the DMA controller 305*a* of the printer controller 103*a* according to the seventh embodiment of the present invention. The same reference numerals as those in the block diagram of FIG. 3 denote the same parts, and a description thereof will not be repeated. The DMA controller 305*a* is different from the DMA controller 305 in FIG. 2 only in that an address generator 502*a* designates increment/decrement of the count value of a ring buffer counter 320.

In FIG. 20, the printer controller 103*a* is configured by adding DMA controllers 321 and 322, an image processor 323, and the ring buffer counter 320 to the printer controller 103 in FIG. 2. The DMA controller 322 reads out bitmap image data stored in a console unit 104 to the image processor 323. The DMA controller 321 writes image data processed by the image processor 323 in an image memory 304. Examples of processes by the image processor 323 are rotation processing and scaling processing. The DMA controllers 321 and 322 are controlled based on an instruction from a CPU 308. The ring buffer counter 320 is connected between the DMA controllers 321 and 305*a*. Both the DMA controllers 305*a* and 321 can refer to the control and state of the ring buffer counter 320 to perform data transfer between them and the image memory 304 using the ring buffer. Upon receiving an increment instruction from the DMA controller 321 which writes data in the ring buffer, the ring buffer counter 320 increments an internal counter (not shown). Upon receiving a decrement instruction from the DMA controller 305*a* which reads out data from the ring buffer, the ring buffer counter 320 decrements the internal counter. The DMA controllers 305*a* and 321 operate based on the count value of the ring buffer counter 320 to send image data of less than one page to the image memory 304 using the ring buffer. The DMA controller 321 can transfer image data to the DMA controller 305*a* without reading an area of the image memory 304 where no image data is stored.

Bitmap image data read out from the image memory 304 via the ring buffer is processed by a blend processing unit 306, and transferred as a video signal to a printing unit 107 via an engine I/F unit 307. The configuration of data transfer between the DMA controllers 321 and 305*a* via the ring buffer according to the seventh embodiment has been explained. However, data transfer between the DMA controller and the CPU 308 via the ring buffer is also possible.

Figure 22A:
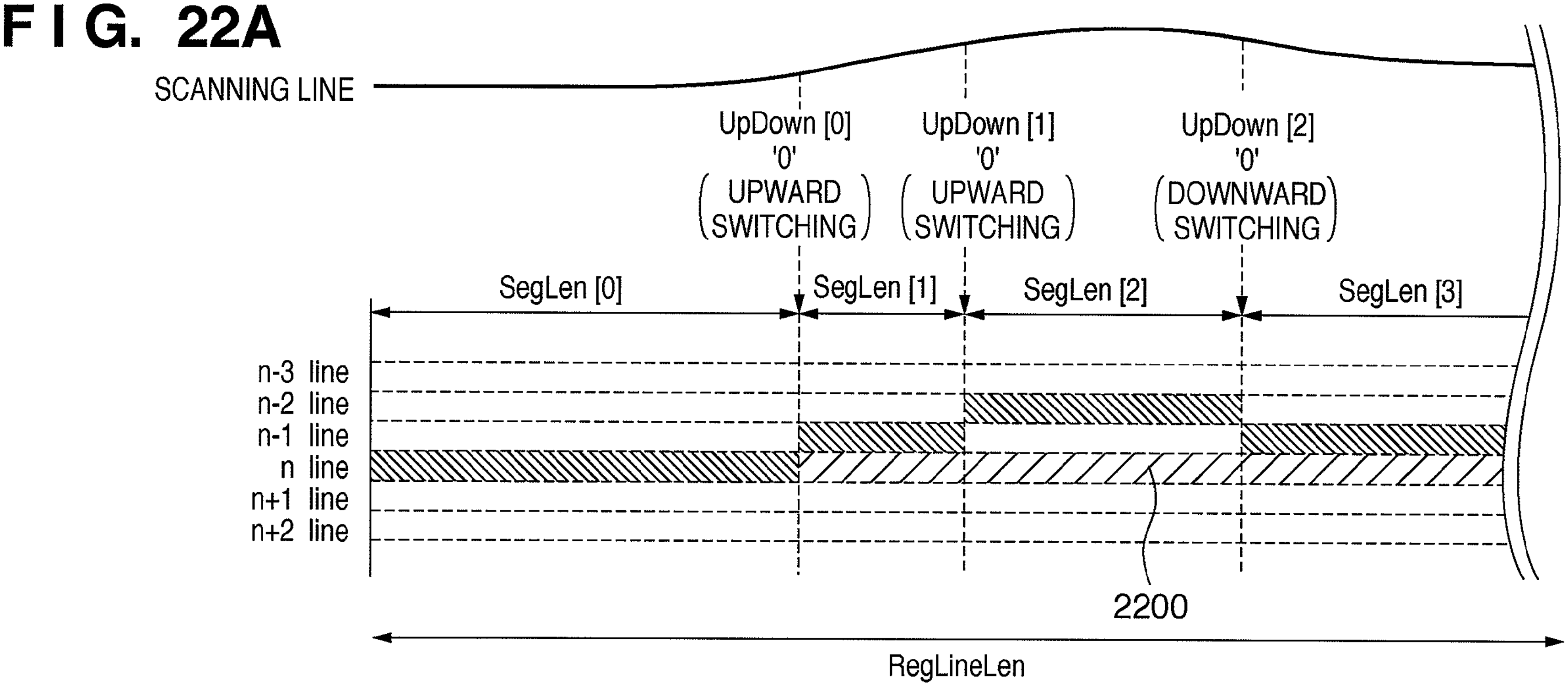
FIGS. 22A and 22B depict views illustrating an example of a method of instructing the DMA controller on the curvature of a scanning line according to the seventh embodiment of the present invention.

FIG. 22A depicts a view explaining a method of instructing the DMA controller 305*a* on the curvature of a scanning line according to the seventh embodiment of the present invention.

In FIG. 22A, an n line 2200 represents a scanning line which is an area where an image is originally formed. One scanning line (its length is RegLineLen) is equally divided into a plurality of segments in accordance with the curvature of the scanning line. SegLen[i] is set as the length of each segment. The variable i corresponds to the order of a segment on one scanning line. UpDown[i] representing whether the scanning line curves up or down is set at each line switching position. The variable i of UpDown[i] also corresponds to the order of a segment on one scanning line. UpDown[i]=0 represents upward switching, and UpDown[i]=1 represents downward switching.

Figure 22B:
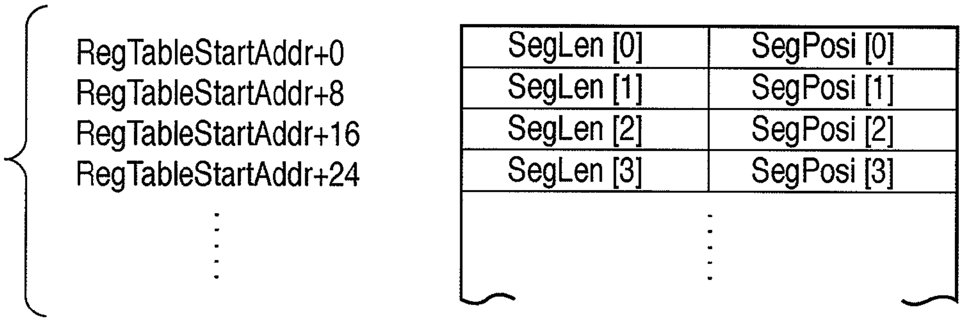

FIG. 22B depicts a view explaining a table which stores a length (segment length) SegLen[i] till the line switching position, and UpDown[i] representing whether to switch the scanning line to an upper or lower one in accordance with the curvature of a scanning line. The table is stored in the image memory 304 or a RAM 310.

A start address RegTableStartAddr in the table is set in a register unit 501 of the DMA controller 305*a*. UpDown[i] takes two values "up" and "down", so "0" is applied to switching the line to an upper one, and "1" is applied to switching the line to a lower one.

The register unit 501 of the DMA controller 305*a* further includes the line length RegLineLen of bitmap image data, and an activation register (not shown) for starting the DMA operation upon completion of setting the register by the CPU 308.

Figure 23A:
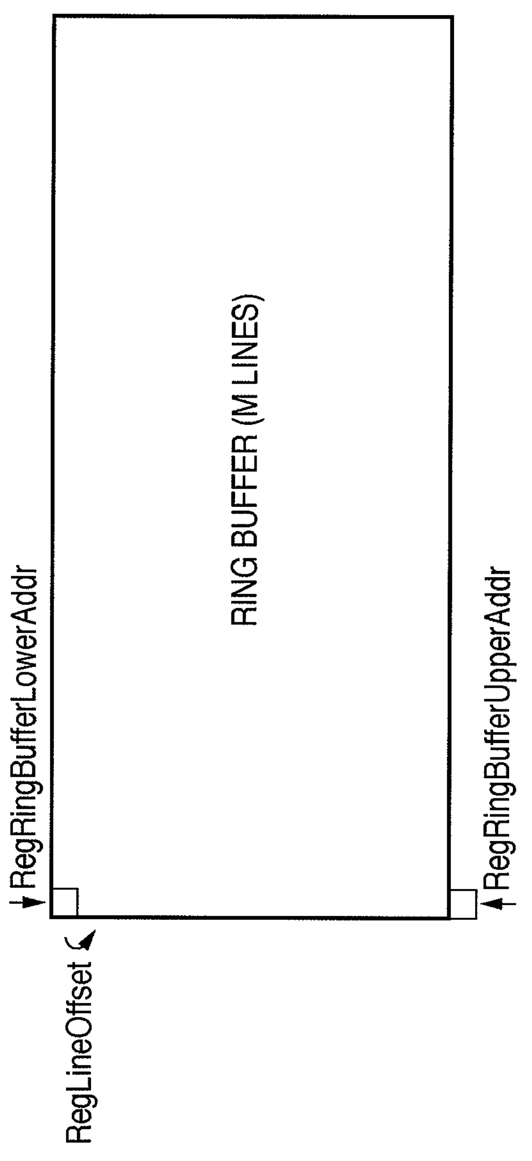
FIGS. 23A to 23C depict views illustrating an example of a method of instructing the DMA controller on a ring buffer area according to the seventh embodiment.
Figure 23B:
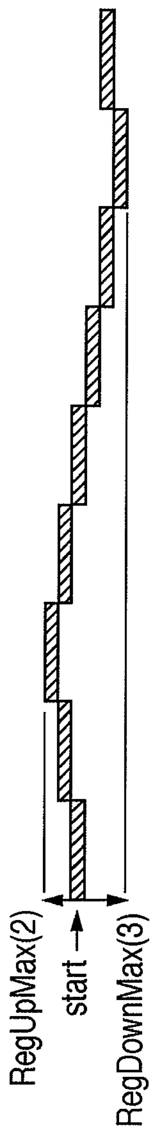
Figure 23C:
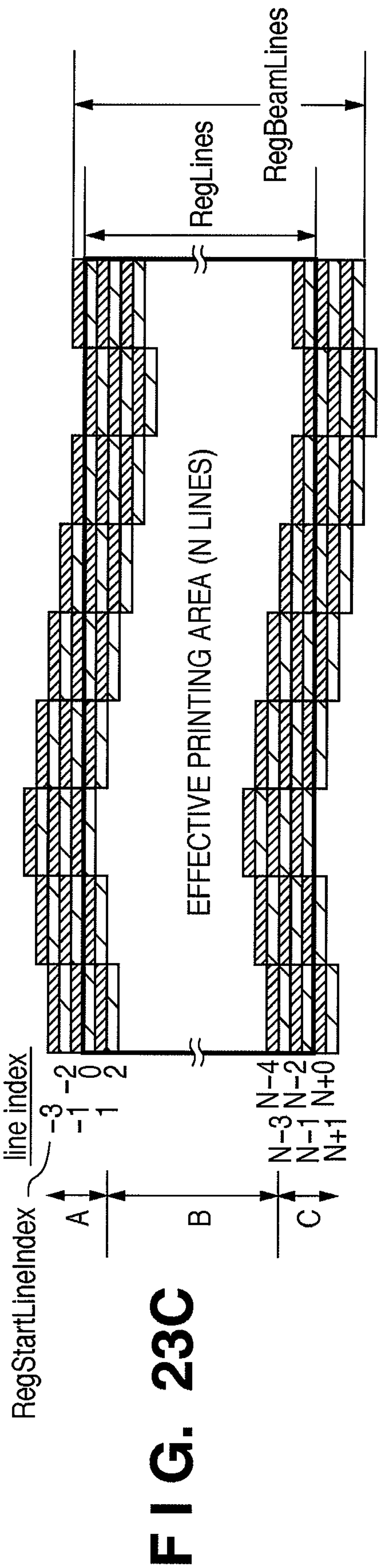
Figure 24A:
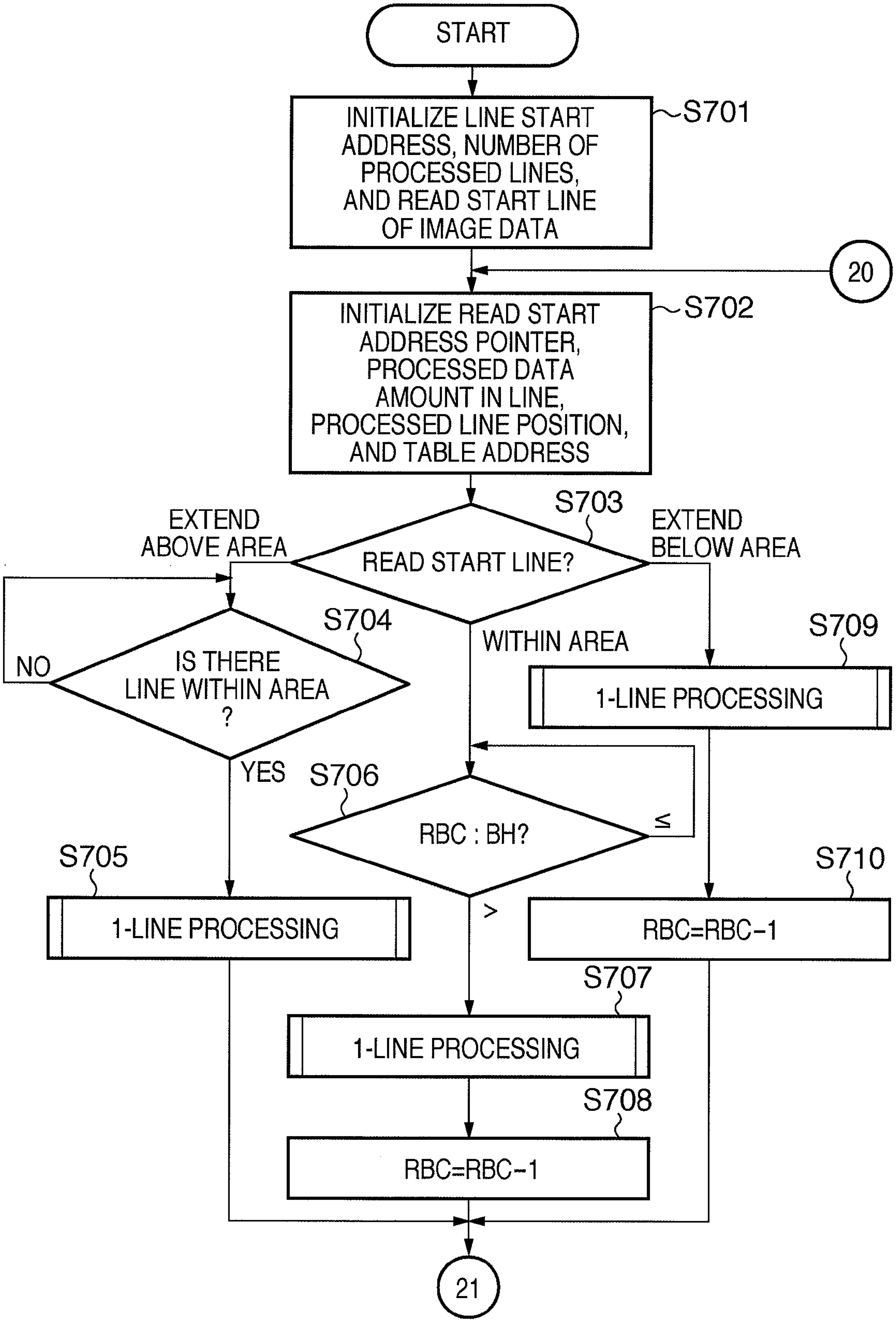
FIGS. 24A and 24B are flowcharts explaining the operation of the address generator of the DMA controller according to the seventh embodiment.
Figure 24B:
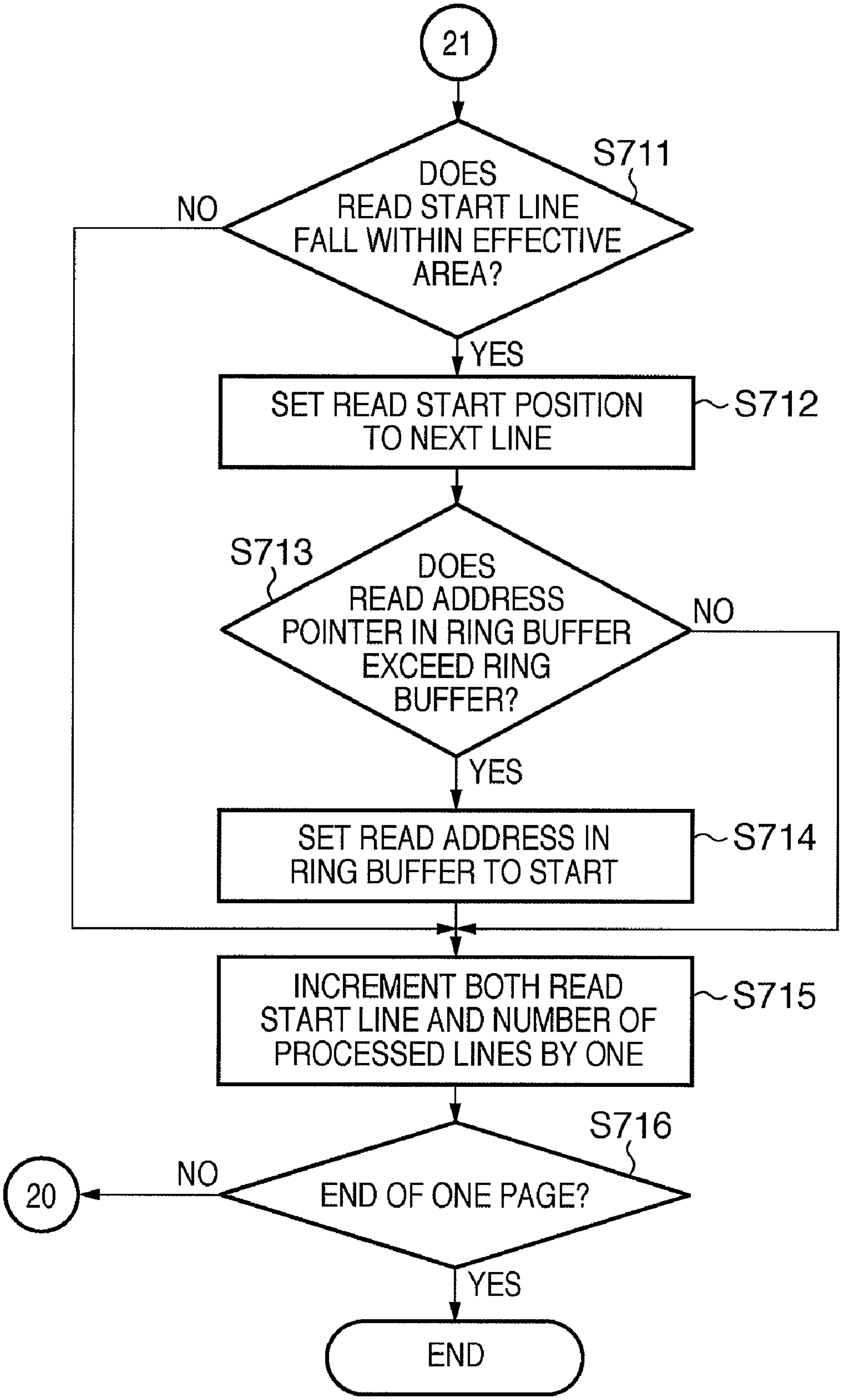

FIGS. 23A to 23C depict views explaining a method of instructing the DMA controller 305*a* on a ring buffer area according to the seventh embodiment.

FIG. 23A depict a view explaining an M-line ring buffer.

An address offset value RegLineOffset between adjacent lines of bitmap image data in the ring buffer is set in the register unit 501. Also, the lower limit value RegRingBufferLowerAddr and upper limit value RegRingBufferUpperAddr of the ring buffer are set. Further, the start address RegStartAddr and the number RegLines of lines of the ring buffer area reserved in the image memory 304 are set in the register unit 501.

FIG. 23B depicts a view illustrating an example of the curvature of a scanning line.

In FIG. 23B, a maximum line count RegUpMax at which the read line switches to an upper one, and a maximum line count RegDownMax at which the read line switches to a lower one are defined from the start of the read line. These values are set in the register unit 501. In the example of FIG. 23B, RegUpMax=2 and RegDownMax=3.

FIG. 23C depicts a view explaining determination of whether the scanning line falls within the effective printing area when the scanning line curves as shown in FIG. 23B.

RegStartLineIndex representing a read start position on a line corresponding to the start address of the ring buffer is set in the register unit 501. The number RegBeamLines of lines to be sent to the blend processing unit 306, and dummy data RegFillData used when outputting data outside the effective printing area are also set. In FIG. 23B, RegUpMax="2" and RegDownMax="3". Thus, the read start line RegStartLineIndex is a line −3 from the start line of the effective printing area. The read end line is a line +2 from the final line of the effective printing area.

Figure 25:
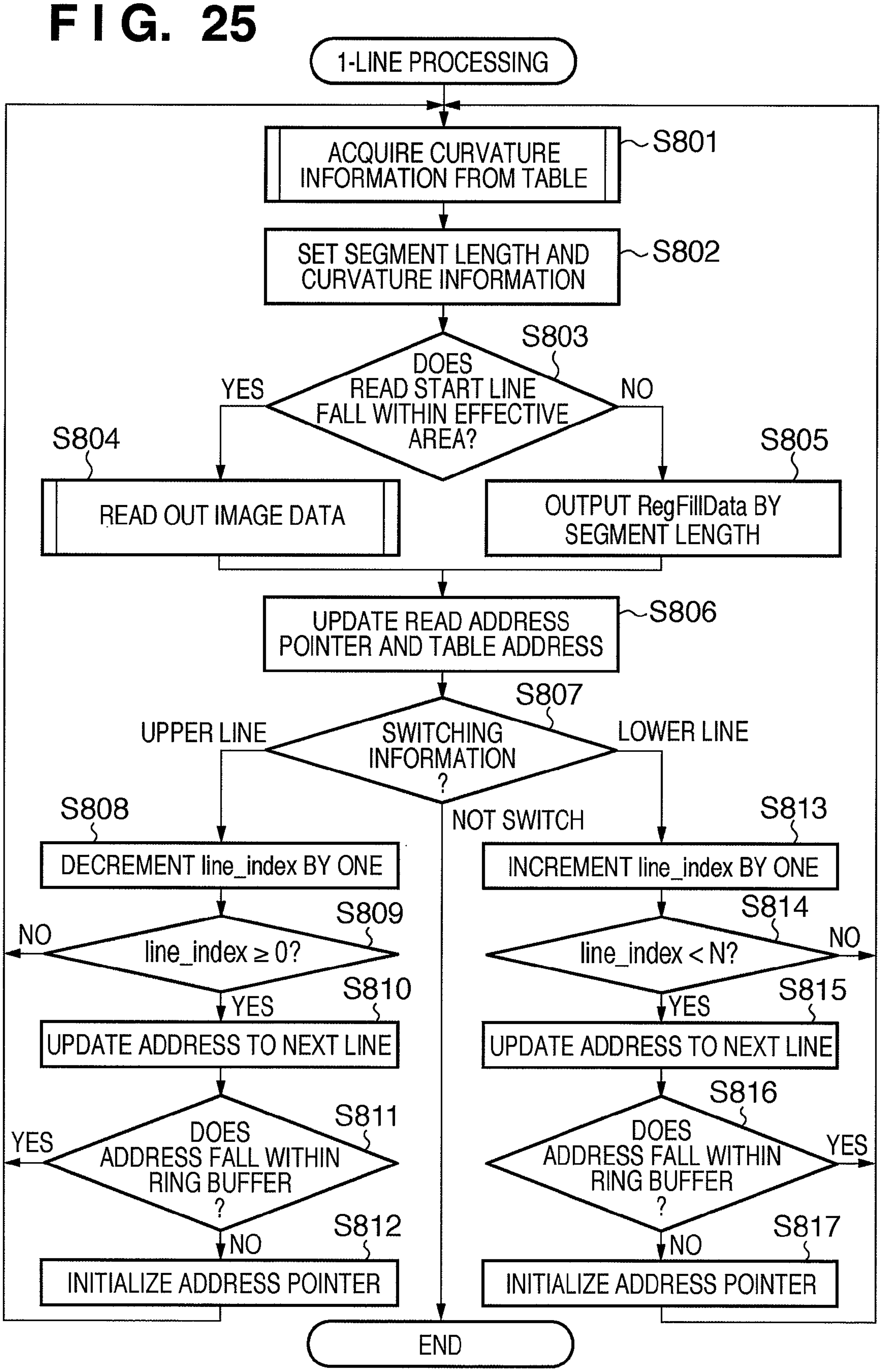
FIG. 25 is a flowchart explaining a 1-line processing operation in the flowcharts of FIGS. 24A and 24B.
Figure 26:
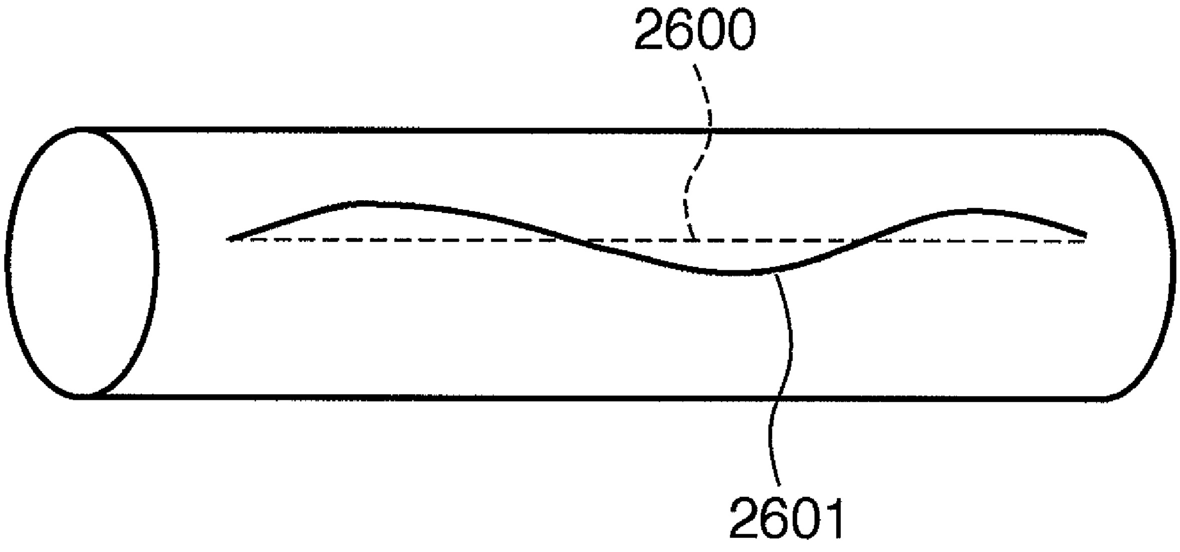
FIG. 26 depicts a view illustrating an example of the curvature (registration error) of a scanning line on a photosensitive drum.

FIGS. 24 and 25 are flowcharts explaining the operation of the address generator 502*a* of the DMA controller 305*a* according to the seventh embodiment.

This processing is executed while the DMA controller 321 stores bitmap image data processed by the image processor 323 in the ring buffer of the image memory 304 and the ring buffer counter 320 is incremented.

In step S701, when the DMA operation starts in response to an instruction from the CPU 308, the start address line_start_addr of each line is initialized to the start address RegStartAddr of the ring buffer area. The number line_cnt of processed lines sent to the blend processing unit 306 is initialized to "0". Further, the read start line start_line_index of image data is initialized to the read start line RegStartLineIndex ("−3" in the example of FIG. 23C). The process advances to step S702 to perform initialization for each line. In this case, a read start address pointer addr_point is initialized to the line start address line_start_addr. A processed data amount line_data_cnt in the line is initialized to "0", and a currently processed line position line_indexs is initialized to the read start position start_line_index of image data. The length SegLen[i] of a segment to be referred to, and the table address table_addr of the line switching information UpDown[i] are initialized to the start address RegTableStartAddr of the table.

The process advances to step S703 to determine which line of the effective printing area shown in FIG. 23C is the read start line start_line_index of image data. If it is determined in step S703 that the read start line start_line_index resides above the effective area, i.e., is one of the lines −3 to 2 in FIG. 23C, the process advances to step S704 and waits until items of image data of the lines −3 to 2 in FIG. 23C are stored in the ring buffer. More specifically, the value of a ring buffer counter RBC is compared with the sum of BH (=RegUpMax+RegDownMax+1)+1 (BH=6 in the seventh embodiment) and (start_line_index −1). After items of image data of the lines −3 to 2 are stored in the ring buffer, the process advances to step S705 to execute 1-line processing, and then to step S711. The 1-line processing will be explained with reference to FIG. 25. The processes in steps S704 and S705 correspond to data processing of lines in area A of FIG. 23C.

If it is determined in step S703 that the read start line start_line_index of image data falls within the effective printing area shown in FIG. 23C, the process advances to step S706. In step S706, the process waits until image data of 6 (BH) lines considering the curvature of the scanning line are stored in the ring buffer. Then, the process advances to step S707. In step S707, 1-line processing (to be described later) is executed. The process advances to step S708 to decrement the ring buffer counter RBC by one, and then to step S711. The processes in steps S706 and S707 correspond to data processing of lines whose image data fall within the effective printing area.

If it is determined in step S703 that the read start line start_line_index of image data is one of lines N−3 to N+1 below the effective printing area shown in FIG. 23C, the process advances to step S709. In step S709, 1-line processing (to be described later) is executed, and the process advances to step S710. In step S710, the ring buffer counter RBC is decremented by one, and then the process advances to step S711. The process in step S709 corresponds to data processing of lines in area C of FIG. 23C.

The 1-line processing in steps S705, S707, and S709 will be explained with reference to the flowchart of FIG. 25.

FIG. 25 is a flowchart explaining the 1-line processing according to the seventh embodiment.

In step S801, curvature information of a line (line indicated by start_line_index) is acquired based on the table address. The process advances to step S802 to set the segment length seg_len and switching information up_down_info of the line in the register. The process advances to step S803 to determine whether the read start line line_index falls within the effective printing area. If it is determined in step S803 that the read start line line_index falls within the effective printing area, the process advances to step S804 to read out data of the target segment of the line. If it is determined in step S803 that the read start line line_index falls outside the effective printing area, the process advances to step S805 to output dummy data RegFillData of the target segment length of the line. After executing step S804 or S805, the process advances to step S806 to update the read address pointer addr_point and table address table_addr of image data. The read address is updated to an address obtained by adding a processed segment length, and the table address is incremented by eight to obtain curvature information of the next segment.

The process advances to step S807 to check the upper/lower line switching information up_down_info. If the switching information is "0" to represent not to switch the line to an upper/lower one, the process ends because no line data need be read out by switching the line. After the final segment, the switching information up_down_info is "0" for even a curved line, so the process ends.

If it is determined in step S807 that the line curves up, the process advances to step S808 to decrement the read line index line_index by one. In step S809, it is determined whether the decremented read line index is negative. If the decremented read line index is positive, the process advances to step S810 to subtract the offset address RegLineOffset of one line in the ring buffer from the read address pointer addr_point, updating the address to that of one preceding line. In step S811, it is determined whether the updated address is larger than the start address RegRingBufferLowerAddr of the ring buffer, i.e., falls within the ring buffer. If the updated address falls within the ring buffer, the process returns to step S801 to execute the above-described processing. If the updated address falls outside the ring buffer, the process advances to step S812 to add the memory area (RegRingBufferUpperAddr−RegRingBufferLowerAddr) of the ring buffer to the read address pointer addr_point, thereby updating the read address pointer to an address within the ring buffer. Then, the process returns to step S801.

If it is determined in step S807 that the line curves down, the process advances to step S813 to increment the read line index line_index by one. In step S814, it is checked whether the incremented read line index exceeds the number N of lines of the ring buffer. If the incremented read line index does not exceed the number N of lines of the ring buffer, the process advances to step S815 to add the offset address RegLineOffset of one line of the ring buffer to the read address pointer addr_point, thereby updating the address to that of the next line. In step S816, it is determined whether the updated address does not exceed the final address RegRingBufferUpperAddr of the ring buffer, i.e., falls within the ring buffer. If the updated address falls within the ring buffer, the process returns to step S801 to execute the above-described processing. If the updated address falls outside the ring buffer, the process advances to step S817 to subtract the memory area (RegRingBufferUpperAddr−RegRingBufferLowerAddr) of the ring buffer from the read address pointer addr_point, thereby updating the read address pointer to an address within the ring buffer. Then, the process returns to step S801. If the calculation result is negative or equal to or larger than N in step S809 or S814, the process returns to step S801.

As described above, in the 1-line processing, image data can be read out for each segment of a line which is stored in the ring buffer and falls within the effective printing area. For a segment falling outside the printing area, dummy data RegFillData is read out.

Referring back to FIGS. 24A and 24B, after executing any one of steps S705, S708, and S710, the process advances to step S711 (FIG. 24B) to determine whether the read line falls within the effective printing area. If the read line falls within the effective printing area, the process advances to step S712 to add the offset address RegLineOffset of one line of the ring buffer to the read line address, updating the address to that of the next line. In step S713, it is determined whether the updated address pointer does not exceed the final address RegRingBufferUpperAddr of the ring buffer, i.e., indicates an address within the ring buffer. If the address pointer indicates an address within the ring buffer, the process advances to step S715. If the address pointer indicates an address outside the ring buffer, the read address pointer is initialized to the start address of the ring buffer in step S714, and the process advances to step S715.

If it is determined in step S711 that the read line falls outside the effective printing area, the process advances to step S715. In step S715, the read circuit line start_line_index is incremented by one, and the number line_cnt of processed lines is incremented by one. In step S716, it is determined whether the number line_cnt of processed lines has reached the number RegBeamLines of lines of one page, i.e., image data of one page has been processed. If image data of one page has been processed, the DMA operation ends. If image data of one page has not been processed, the process returns to step S702 to execute processing for the next scanning line. At the end of the DMA operation, the DMA controller 305*a* sends an interrupt (not shown) to the CPU 308. The CPU 308 detects the interrupt to detect that the DMA operation has ended.

As described above, according to the seventh third embodiment, the DMA controller can read out curved image data using the ring buffer while switching between lines to correct the curvature of a scanning line. The curvature of a laser beam can be corrected using a buffer of a capacity smaller than image data of one page.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-042071, filed Feb. 22, 2008, which is hereby incorporated by reference herein in its entirety.

What is claimed is:

1. An image processing apparatus comprising:

an image forming unit configured to form an image on a photosensitive drum by scanning the photosensitive drum with a light corresponding to image data;

a storage unit configured to store image data of at least a plurality of lines;

a data reading unit configured to read out image data in a line direction of the scanning line from said storage unit on the basis of a read start address of the image data and a burst transfer length, and to burst-transfer the image data;

a setting unit configured to set a switching address in the line direction for switching a line of image data read out by said data reading unit, the switching address being set so as to correct a curvature of the scanning line;

a generation unit configured to generate, based on the switching address, a second read start address for reading out image data of a second line, so as to read out image data of at least a first line before line switching and the second line after the line switching, by burst transfer, in accordance with the switching address set by said setting unit; and an output unit configured to output image data for generating image data of one line on the basis of image data corresponding to an effective area in the image data which is read out from said storage unit and burst-transferred by said data reading unit.

2. The apparatus according to claim 1, further comprising a memory unit configured to store information representing the number of lines shifted up or down from a reference line at the switching address before the line switching, wherein said generation unit generates the second read start address based on the information stored in said memory unit.

3. The apparatus according to claim 1, wherein said generation unit generates the second read start address so as to make a read address in the line direction for image data of the first line read out by said data reading unit overlap a read address in the line direction for image data of the second line read out by said data reading unit, and said output unit outputs image data of one line after performing halftone processing based on the image data of the first and second lines, in which the read addresses in the line direction of which overlap each other.

4. The apparatus according to claim 1, wherein said data reading unit reads out image data from said storage unit via a ring buffer.

5. The apparatus according to claim 1, further comprising an image forming unit configured to form an image on a sheet on the basis of the image data output by said output unit.

6. A method of controlling an image processing apparatus including an image forming unit configured to form image on a photosensitive drum by scanning the photosensitive drum with a light corresponding to image data, the method comprising:

a data reading step of reading out, based on a read start address of image data and a burst transfer length, the image data in a line direction from a memory which stores image data of at least a plurality of lines, and burst-transferring the image data;

a setting step of setting a switching address in the line direction for switching a line of image data read out in said data reading step, the switching address being set so as to correct a curvature of the scanning line;

a generation step of generating, based on the switching address, a second read start address for reading out image data of a second line, so as to read out image data by burst transfer of at least a first line before line switching and the second line after the line switching, in accordance with the switching address set in said setting step; and an output step of outputting image data for generating image data of one line based on image data corresponding to an effective area in the image data which is read out from the memory and burst-transferred in said data reading step.

* * * * *